United States Patent
Yamamoto et al.

(10) Patent No.: US 10,632,915 B2
(45) Date of Patent: Apr. 28, 2020

(54) SURROUNDINGS MONITORING APPARATUS

(71) Applicant: AISIN SEIKI KABUSHIKI KAISHA, Kariya-shi, Aichi (JP)

(72) Inventors: Kinji Yamamoto, Anjo (JP); Naotaka Kubota, Kariya (JP); Kazuya Watanabe, Anjo (JP); Takayuki Nakasho, Anjo (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 15/755,285

(22) PCT Filed: Sep. 14, 2016

(86) PCT No.: PCT/JP2016/077187
§ 371 (c)(1),
(2) Date: Feb. 26, 2018

(87) PCT Pub. No.: WO2017/057006
PCT Pub. Date: Apr. 6, 2017

(65) Prior Publication Data
US 2018/0229657 A1   Aug. 16, 2018

(30) Foreign Application Priority Data
Sep. 30, 2015   (JP) .................. 2015-192626

(51) Int. Cl.
*B60R 11/04* (2006.01)
*B60R 1/00* (2006.01)
(Continued)

(52) U.S. Cl.
CPC ................ *B60R 1/00* (2013.01); *B60R 11/02* (2013.01); *G06T 3/60* (2013.01); *H04N 5/44504* (2013.01);
(Continued)

(58) Field of Classification Search
CPC .......... B60R 2300/20; B60R 2300/605; B60R 2300/308; B60R 2300/607;
(Continued)

(56) References Cited

U.S. PATENT DOCUMENTS 2,610,364 A * 9/1952 Brower ..................... E04H 6/10
52/174
3,105,221 A * 9/1963 Schwarz ................... E04H 6/42
235/99 A
(Continued)

FOREIGN PATENT DOCUMENTS

CN   100438623 C   11/2008
JP   3300334 B2   7/2002
(Continued)

OTHER PUBLICATIONS

International Search Report of PCT/JP2016/077187 dated Nov. 22, 2016 [PCT/ISA/210].
(Continued)

*Primary Examiner* — Philip P. Dang
(74) *Attorney, Agent, or Firm* — Sughrue Mion, PLLC

(57) ABSTRACT

A surroundings monitoring apparatus includes an image acquisition portion acquiring captured image data, an image conversion portion converting the captured image data to virtual image data with a plurality of virtual viewpoints, and a data control portion sequentially displaying the virtual image data at a display unit in a state where each of the virtual viewpoints moves from a first virtual viewpoint position at which an opposite side of the vehicle is viewed, through a second virtual viewpoint position at which the vehicle is viewed from an overhead region of the vehicle, and to a third virtual viewpoint position at which the one side of the vehicle is viewed. The data control portion rotates the virtual image data with reference to a line of sight of the virtual viewpoint while the virtual image data is displayed so (Continued)

that the virtual viewpoint passes through the second virtual viewpoint position.

12 Claims, 15 Drawing Sheets

(51) Int. Cl.
    *H04N 7/18*           (2006.01)
    *B60R 11/02*         (2006.01)
    *G06T 3/60*          (2006.01)
    *H04N 13/111*       (2018.01)
    *H04N 5/445*        (2011.01)
    *H04N 13/243*       (2018.01)

(52) U.S. Cl.
    CPC .............. *H04N 7/18* (2013.01); *H04N 7/181* (2013.01); *H04N 13/111* (2018.05); *B60R 2300/102* (2013.01); *B60R 2300/20* (2013.01); *B60R 2300/303* (2013.01); *B60R 2300/307* (2013.01); *B60R 2300/308* (2013.01); *B60R 2300/605* (2013.01); *B60R 2300/607* (2013.01); *B60R 2300/8066* (2013.01); *B60R 2300/8093* (2013.01); *H04N 13/243* (2018.05)

(58) Field of Classification Search
    CPC ...... B60R 2300/8066; B60R 2300/102; B60R 2300/307; B60R 2300/8093; B60R 2300/303; B60R 1/00; B60R 11/02; H04N 5/44504; H04N 13/111; H04N 7/181; G06T 3/60
    See application file for complete search history.

(56) References Cited

U.S. PATENT DOCUMENTS

| | | | | |
|---|---|---|---|---|
| 5,526,357 | A * | 6/1996 | Jandrell | G01S 5/0009 340/991 |
| 6,057,754 | A * | 5/2000 | Kinoshita | B62D 1/28 340/435 |
| 6,142,871 | A * | 11/2000 | Inoue | A63F 13/10 463/6 |
| 6,611,744 | B1 * | 8/2003 | Shimazaki | B60R 1/00 180/168 |
| 6,825,880 | B2 * | 11/2004 | Asahi | B60Q 9/005 340/932.2 |
| 6,885,968 | B2 * | 4/2005 | Breed | B60Q 9/008 702/142 |
| 7,049,945 | B2 * | 5/2006 | Breed | B60Q 9/008 340/435 |
| 7,145,519 | B2 * | 12/2006 | Takahashi | G06K 9/00791 345/7 |
| 7,161,616 | B1 * | 1/2007 | Okamoto | B60R 1/00 348/148 |
| 7,164,117 | B2 * | 1/2007 | Breed | B60R 21/01516 250/208.1 |
| 7,199,767 | B2 * | 4/2007 | Spero | G02B 5/20 250/203.4 |
| 7,209,221 | B2 * | 4/2007 | Breed | B60N 2/002 356/28 |
| 7,264,386 | B2 * | 9/2007 | Ito | B60Q 1/14 362/461 |
| 7,295,227 | B1 * | 11/2007 | Asahi | B60R 1/00 348/118 |
| 7,359,782 | B2 * | 4/2008 | Breed | B60R 21/0134 180/274 |
| 7,630,806 | B2 * | 12/2009 | Breed | B60R 21/0134 180/273 |
| 7,640,050 | B2 * | 12/2009 | Glenn, Jr. | A61B 5/4255 600/407 |
| 7,663,502 | B2 * | 2/2010 | Breed | B60C 11/24 340/12.25 |
| 7,783,403 | B2 * | 8/2010 | Breed | B60R 21/0134 340/435 |
| 7,825,784 | B2 * | 11/2010 | Yamanaka | B60R 1/00 340/435 |
| 7,990,283 | B2 * | 8/2011 | Breed | B60N 2/2863 340/903 |
| 8,289,391 | B2 * | 10/2012 | Kiyohara | G06K 9/342 348/148 |
| 8,560,169 | B2 * | 10/2013 | Sasajima | G08G 1/14 340/932.2 |
| 8,773,534 | B2 * | 7/2014 | Kitaura | G06T 7/55 348/148 |
| 8,893,971 | B1 * | 11/2014 | Sammut | F41G 1/38 235/404 |
| 8,944,456 | B2 * | 2/2015 | Tsukerman | B62D 21/14 280/638 |
| 9,069,080 | B2 * | 6/2015 | Stettner | G01S 17/023 |
| 2005/0264432 | A1 * | 12/2005 | Tanaka | B60Q 9/004 340/932.2 |
| 2006/0208169 | A1 * | 9/2006 | Breed | B60N 2/002 250/221 |
| 2007/0057816 | A1 * | 3/2007 | Sakakibara | B62D 15/027 340/932.2 |
| 2007/0063874 | A1 * | 3/2007 | Danz | B60Q 9/006 340/932.2 |
| 2007/0265088 | A1 * | 11/2007 | Nakada | A63F 13/21 463/37 |
| 2012/0127312 | A1 * | 5/2012 | Nagamine | B60R 1/00 348/148 |
| 2013/0120578 | A1 * | 5/2013 | Iga | B60R 1/00 348/148 |
| 2013/0275918 | A1 * | 10/2013 | Antonini | G06F 3/04815 715/841 |
| 2014/0152774 | A1 * | 6/2014 | Wakabayashi | G08G 1/168 348/46 |
| 2014/0244070 | A1 * | 8/2014 | Inagaki | B62D 15/0285 701/1 |
| 2014/0309853 | A1 * | 10/2014 | Ricci | H04W 4/21 701/34.4 |
| 2015/0014077 | A1 * | 1/2015 | Tsitimakis | B60S 9/205 180/199 |
| 2015/0015487 | A1 * | 1/2015 | Nakayama | G06F 3/012 345/156 |
| 2015/0054661 | A1 * | 2/2015 | Noh | G08G 1/141 340/932.2 |
| 2015/0070196 | A1 * | 3/2015 | Beaurepaire | G08G 1/162 340/932.2 |
| 2015/0070319 | A1 * | 3/2015 | Pryor | G06F 3/0425 345/175 |
| 2015/0100177 | A1 * | 4/2015 | Inagaki | B60W 30/06 701/1 |
| 2015/0109409 | A1 * | 4/2015 | Isogai | G06T 15/205 348/43 |
| 2015/0151789 | A1 * | 6/2015 | Lee | B62D 15/0285 701/41 |
| 2015/0202939 | A1 * | 7/2015 | Stettner | B60R 21/0134 701/37 |
| 2015/0298547 | A1 * | 10/2015 | Inoue | B60K 28/14 701/70 |

FOREIGN PATENT DOCUMENTS

| | | | |
|---|---|---|---|
| JP | 2006-171849 | A | 6/2006 |
| JP | 2009-171537 | A | 7/2009 |
| JP | 2012039341 | * | 8/2010 |
| JP | 2012-039341 | A | 2/2012 |
| JP | 2012039341 | * | 2/2012 |
| JP | 02012257004 | * | 12/2012 |
| JP | 5168186 | B2 | 3/2013 |
| JP | 2015088942 | * | 5/2015 |

OTHER PUBLICATIONS

Written Opinion of PCT/JP2016/077187 dated Nov. 22, 2016 [PCT/ISA/237].

(56) References Cited

OTHER PUBLICATIONS

Communication dated Sep. 27, 2019 from the State Intellectual Property Office of People's Republic of China in application No. 201680049819.4.

* cited by examiner

SURROUNDINGS MONITORING APPARATUS

CROSS REFERENCE TO RELATED APPLICATIONS

This application is a National Stage of International Application No. PCT/JP2016/077187, filed Sep. 14, 2016, claiming priority based on Japanese Patent Application No. 2015-192626, filed Sep. 30, 2015.

TECHNICAL FIELD

An embodiment of the present invention relates to a surroundings monitoring apparatus.

BACKGROUND ART

A technique where a viewpoint conversion processing is performed on a vehicle-surrounding image captured by a camera that is mounted at a vehicle so that the resulting image is displayed at a display unit arranged within a vehicle interior is known.

DOCUMENT OF PRIOR ART

Patent Document

Patent document 1: JP5168186B2

OVERVIEW OF INVENTION

Problem to be Solved by Invention

A positional relationship between the vehicle and an object which exists around the vehicle and a state of such object may be comprehensively difficult to be recognized. For example, the positional relationship between the vehicle and the object around the vehicle may be easily grasped by an overhead view image obtained by the viewpoint conversion processing. Nevertheless, a posture or a size, for example, of the object may be difficult to be recognized by simply displaying the overhead view image. Therefore, providing a surroundings monitoring apparatus which may achieve image display by which a user easily grasps the positional relationship between the vehicle and the object around the vehicle and the posture or the size of the object may be effective for improving safety and easiness of vehicle driving.

Means for Solving Problem

A surroundings monitoring apparatus according to the embodiment of the present invention includes, for example, an image acquisition portion acquiring captured image data output from an imaging portion which is mounted at a vehicle to capture an image of surroundings of the vehicle, an image conversion portion converting the captured image data to virtual image data with a plurality of virtual viewpoints serving as imaging directions towards the vehicle, and a control portion sequentially displaying the virtual image data at a display unit provided at a vehicle interior of the vehicle in a state where each of the virtual viewpoints moves from a first virtual viewpoint position at which an opposite side of the vehicle is viewed beyond the vehicle from one side of the vehicle, through a second virtual viewpoint position at which the vehicle is viewed from an overhead region of the vehicle, and to a third virtual viewpoint position at which the one side of the vehicle is viewed beyond the vehicle from the other side of the vehicle. The control portion rotates the virtual image data with reference to a line of sight of the virtual viewpoint while the virtual image data is displayed so that the virtual viewpoint passes through the second virtual viewpoint position. According to the above construction, for example, how an object which exists in surroundings of the vehicle is looked gradually changes in a course of movement of the virtual viewpoint facing the vehicle from the first virtual viewpoint position, through the second virtual viewpoint position above the vehicle, and to the third virtual viewpoint position and in a course of rotation of the virtual image data at the second virtual viewpoint position. As a result, a positional relationship between the object existing in the surroundings of the vehicle and the vehicle, a posture and a size of the object may be easily recognizably displayed.

In addition, the control portion of the surroundings monitoring apparatus, for example, may decide the second virtual viewpoint position to be positioned directly above the vehicle. According to such construction, a positional relationship between the vehicle (own vehicle) and a surrounding state may be easily grasped.

Further, the control portion of the surroundings monitoring apparatus, for example, may rotate the virtual image data by 180° at the second virtual viewpoint position which is decided to be positioned directly above the vehicle. The rotation of the virtual image data in a state where the surrounding state of the vehicle is easily grasped may restrain decrease in recognition of the positional relationship of the object. Because a display position of the object existing in the surroundings of the vehicle changes in association with the rotation of the virtual image data, recognition of the object may increase. Because an up-down direction is appropriately indicated in a case where the image by the virtual image data is displayed at the third virtual viewpoint position, reproducibility of actual world may improve.

Furthermore, the control portion of the surroundings monitoring apparatus, for example, may decide the third virtual viewpoint position to be positioned at a rear side relative to an expected travelling direction of the vehicle in a case where the vehicle is started. According to such construction, for example, an image in an observing direction where attention may be ultimately paid to for starting the vehicle may be provided at the end. Thus, the display which brings a user to easily understand the state of the surroundings of the vehicle is obtainable.

Furthermore, the image conversion portion of the surroundings monitoring apparatus, for example, may convert the captured image data to the virtual image data by projecting the captured image data on a curved surface with reference to the position of the vehicle. According to such construction, for example, even in a case where the virtual viewpoint is specified in a horizontal direction relative to the vehicle, expression of a height component of the projection image is available so that the existence or the size of the object may be proposed to the user.

Furthermore, the image conversion portion of the surroundings monitoring apparatus, for example, may convert the captured image data to the virtual image data by projecting the captured image data on a plane with reference to the position of the vehicle. According to such construction, for example, a conversion processing from the captured image data to the virtual image data is easier than a case where the captured image data is projected on the curved surface, which may decrease processing load or increase processing speed.

Furthermore, the control portion of the surroundings monitoring apparatus, for example, may display an image of an own vehicle by superimposing the image on the virtual image data. According to such construction, for example, the positional relationship between the object existing in the surroundings of the own vehicle and the own vehicle may be easily recognized by the user. As for the image of the own vehicle, image data stored at a memory unit, for example, may be utilized. The image data of the own vehicle may be achieved by photographed data of the actual vehicle or by animation. The image data of the vehicle may be expressed in translucent or diagrammatic view.

MODE FOR CARRYING OUT THE INVENTION

An embodiment of the present invention is disclosed below. Constructions of the following embodiment and operations, results and effects resulting from such constructions are examples. The present invention is achievable by the other constructions than the constructions disclosed in the embodiment below. In addition, the invention may obtain at least one of various effects based on the basic constructions and secondary effects.

In the embodiment, a vehicle 1 at which a surroundings monitoring apparatus is mounted may be an automobile including an internal combustion engine, not illustrated, as a drive source, i.e., an internal combustion engine car or may be an automobile including an electric motor, not illustrated, as the drive source, i.e., an electric car or a fuel cell car, for example. The vehicle 1 may be a hybrid car including both the internal combustion engine and the electric motor as the drive sources or an automobile including the other drive source. The vehicle 1 may include any kind of speed changers and any apparatuses necessary for driving the internal combustion engine or the electric motor, i.e., systems or components, for example. Further, system, quantity and layout, for example of an apparatus pertaining to a driving of a wheel 3 at the vehicle 1 may be variously specified.

Figure 1:
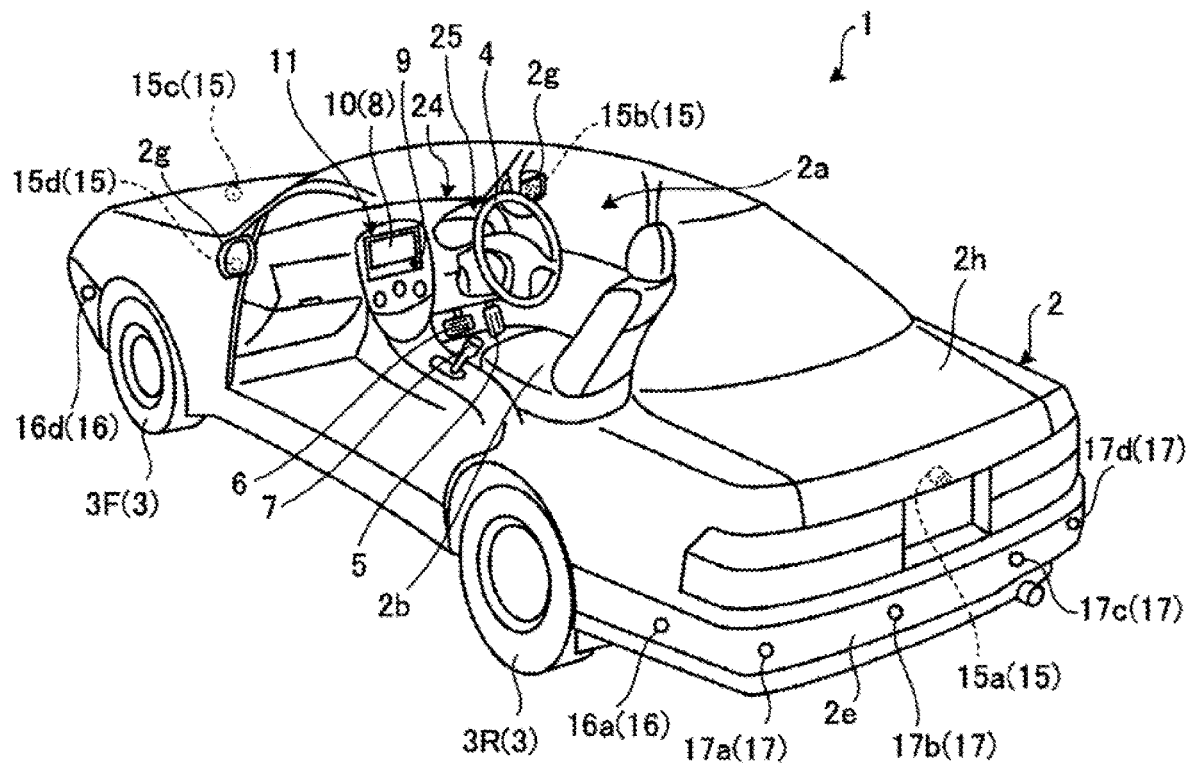
FIG. 1 is a perspective view illustrating an example of a state where a vehicle interior of a vehicle at which a surroundings monitoring apparatus according to an embodiment is mounted is partially transparently viewed.

As illustrated in FIG. 1, a vehicle body 2 constitutes a vehicle interior 2a where an occupant not illustrated gets in. In the vehicle interior 2a, a steering portion 4, an accelerating operation portion 5, a braking operation portion 6 and a speed change operation portion 7, for example, are provided in a state facing a seat 2b of a driver serving as the occupant. The steering portion 4 is a steering wheel protruding from a dashboard 24, for example. The accelerating operation portion 5 is an accelerator pedal positioned at the foot of the driver, for example. The braking operation portion 6 is a brake pedal positioned at the foot of the driver, for example. The speed change operation portion 7 is a shift lever protruding from a center console, for example. Here, the steering portion 4, the accelerating operation portion 5, the braking operation portion 6 and the speed change operation portion 7, for example, are not limited to the above.

A display unit 8 serving as a display output portion and an audio output unit 9 serving as an audio output portion are provided at the vehicle interior 2a. The display unit 8 is an LCD (liquid crystal display) or an OELD (organic electroluminescent display), for example. The audio output unit 9 is a speaker, for example. The display unit 8 is covered by a transparent operation input portion 10 such as a touch panel, for example. The occupant may visually recognize the image displayed at a display screen of the display unit 8 via the operation input portion 10. The occupant may perform an operation input by operating, i.e., touching, pushing or moving, the operation input portion 10 with one's finger, for example, at a position corresponding to the image displayed at the display screen of the display unit 8. The display unit 8, the audio output unit 9 and the operation input portion 10, for example, are provided at a monitor device 11 which is positioned at a center portion in a vehicle width direction, i.e., in a left-right direction, of the dashboard 24. The monitor device 11 may include an operation input portion not illustrated such as a switch, a dial, a joystick and a pressing button, for example. In addition, an audio output unit not illustrated may be provided at the other position than the position at which the monitor device 11 is provided at the vehicle interior 2a. The audio output unit 9 of the monitor device 11 and the other audio output unit may output sound. The monitor device 11 may be shared with a navigation system or an audio system, for example.

Figure 3:
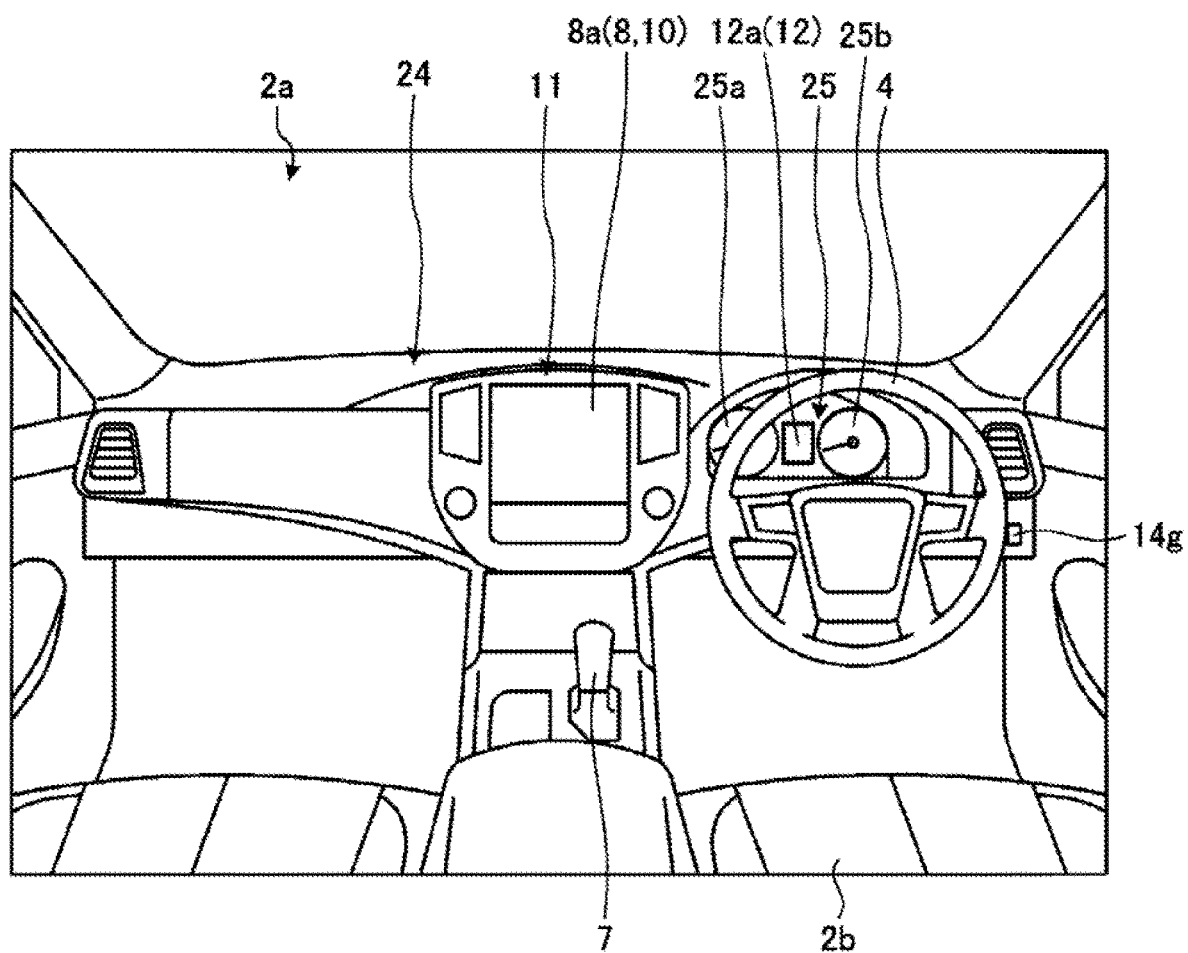
FIG. 3 is a diagram illustrating an example of a dashboard of the vehicle at which the surroundings monitoring apparatus according to the embodiment is mounted and viewed from a rear side of the vehicle.

A display unit 12 different from the display unit 8 is provided at the vehicle interior 2a. As illustrated in FIG. 3, the display unit 12 is provided at an instrument panel 25 of the dashboard 24, for example, and is positioned substantially at a center of the instrument panel 25 between a speed display portion 25a and a rotation number display portion 25b. A size of a screen 12a of the display unit 12 is smaller than a size of a screen 8a (FIG. 3) of the display unit 8. The display unit 12 may display an image mainly indicating information which relates to parking assist of the vehicle 1. An amount of information displayed at the display unit 12 may be smaller than an amount of information displayed at the display unit 8. The display unit 12 is an LCD or an OELD, for example. The information displayed at the display unit 12 may be displayed at the display unit 8.

Figure 2:
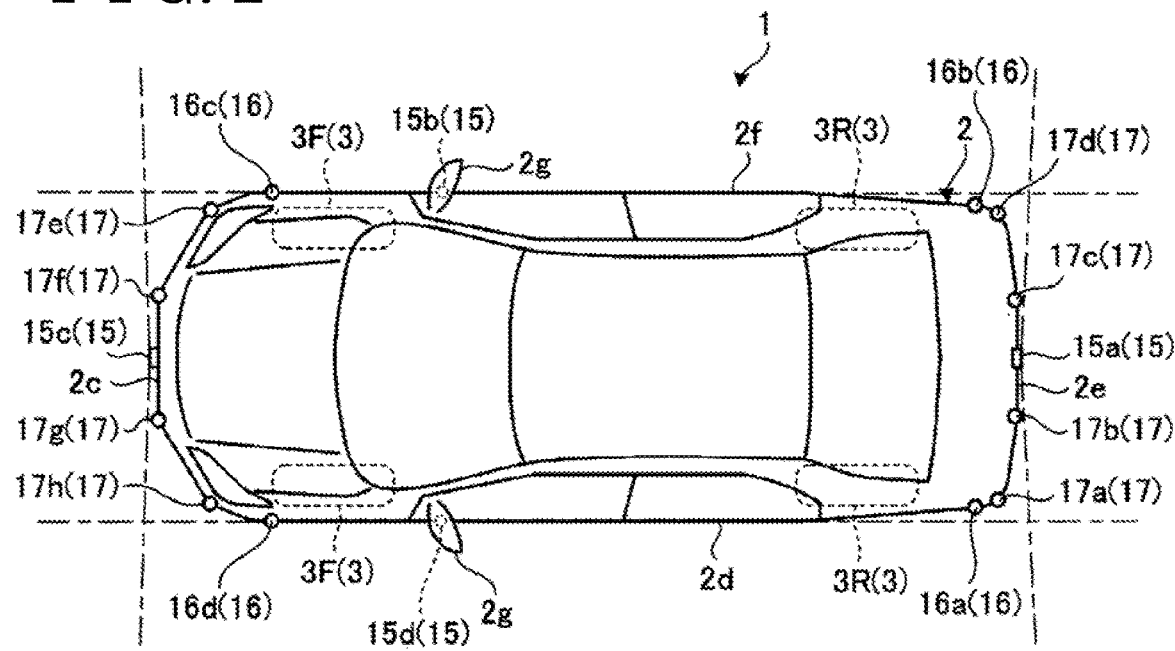
FIG. 2 is a plan view illustrating an example of the vehicle at which the surroundings monitoring apparatus according to the embodiment is mounted.
Figure 4:
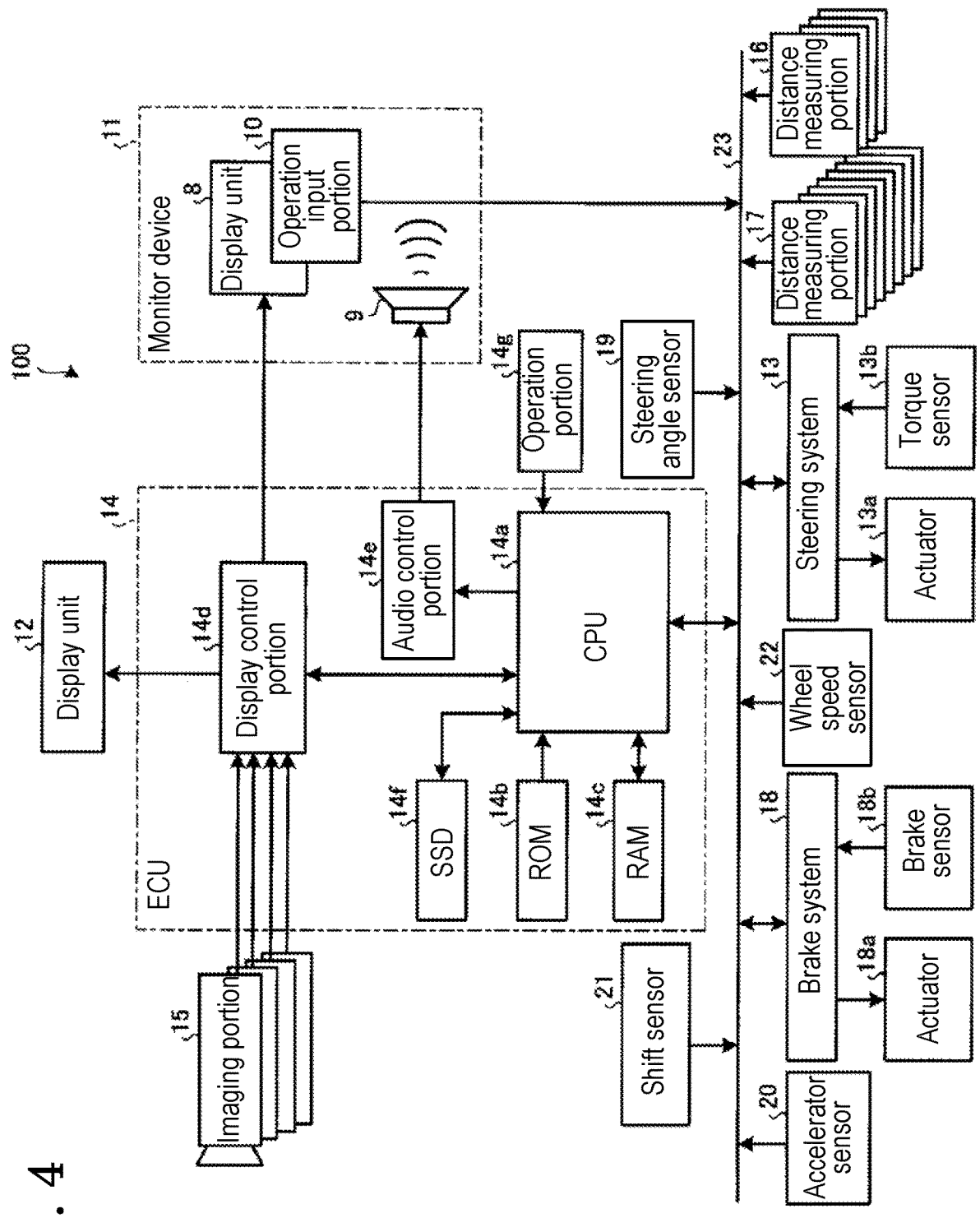
FIG. 4 is a block diagram illustrating an example of an image control system including the surroundings monitoring apparatus according to the embodiment.

As illustrated in FIGS. 1 and 2, the vehicle 1 is a four-wheel automobile, for example, and includes left and right two front wheels 3F and left and right two rear wheels 3R. These four wheels 3 are configured to be steerable. As illustrated in FIG. 4, the vehicle 1 includes a steering system 13 which steers at least two of the wheels 3. The steering system 13 includes an actuator 13a and a torque sensor 13b. The steering system 13 is electrically controlled by an ECU 14 (electronic control unit), for example, to operate the actuator 13a. The steering system 13 is an electrical power steering system or an SBW (steer by wire) system, for example. The steering system 13 applies torque, i.e., assist torque, to the steering portion 4 by the actuator 13a so as to supplement a steering force or steer the wheels 3 by the actuator 13a. In this case, the actuator 13a may steer one of the wheels 3 or the plural wheels 3. The torque sensor 13b detects torque applied to the steering portion 4 by the driver, for example.

As illustrated in FIG. 2, plural imaging portions 15, i.e., four imaging portions 15a, 15b, 15c and 15d, for example, are provided at the vehicle body 2. Each of the imaging portions 15 is a digital camera incorporating an imaging element such as a CCD (charge coupled device) and a CIS (CMOS image sensor), for example. The imaging portion 15 may output moving image data (captured image data) at a predetermined frame rate. The imaging portion 15 includes a wide-angle lens or a fish-eye lens so as to image a region with 140° to 190°, for example, in a horizontal direction. An optical axis of the imaging portion 15 is specified obliquely downward. Thus, the imaging portion 15 sequentially images a road surface on which the vehicle 1 is movable and an environment outside and around the vehicle 1 including a region where parking of the vehicle 1 is available so as to output the captured image as captured imaging data.

The imaging portion 15a is positioned at a rear end portion 2e of the vehicle body 2 and is provided at a wall portion below a door 2h of a rear trunk, for example. The imaging portion 15b is positioned at a right end portion 2f of the vehicle body 2 and is provided at a right door mirror 2g, for example. The imaging portion 15c is positioned at a front side of the vehicle body 2, i.e., at a front end portion 2c in a vehicle front-rear direction and is provided at a front bumper, for example. The imaging portion 15d is positioned at a left side of the vehicle body 2, i.e., at a left end portion 2d in the vehicle width direction and is provided at a left door mirror 2g serving as a protruding portion. The ECU 14 performs a calculation processing and an image processing based on image data acquired by the plural imaging portions 15 to generate a wider view angle image and a virtual overhead image as viewed from an upper side of the vehicle 1, for example.

The ECU 14 may also convert the captured image data provided by the imaging portions 15 to virtual image data as being captured from plural virtual viewpoints serving as imaging directions towards the vehicle 1. The plural virtual image data are sequentially displayed at the display unit 8 so that an image (substantial moving image) where the vehicle 1 at which a user (a driver) is in is positioned at a center and viewed from a distance in the surroundings of the vehicle 1 may be displayed. Details of the display of the virtual image data are explained later. The ECU 14 may also perform parking assist by detecting (extracting) a parking zone indicated with zone lines, for example, in a state where the ECU 14 recognizes the zone lines indicated on the road surface around the vehicle 1 from the captured image data provided by the imaging portions 15.

In addition, as illustrated in FIGS. 1 and 2, four distance measuring portions 16a to 16d and eight distance measuring portions 17a to 17h serving as plural distance measuring portions 16 and 17 are provided at the vehicle body 2. Each of the distance measuring portions 16 and 17 is a sonar which emits ultrasonic sounds to capture reflected wave thereof. The sonar is also referred to as a sonar sensor or an ultrasonic sonar, for example. The distance measuring portion 16 may detect a first obstacle (an adjacent vehicle) which is arranged next to the vehicle 1 or a second obstacle (for example, a curb, a step, a wall and a fence) which exists behind a space for parking, in a case where the vehicle 1 is parked, so as to measure a distance to such obstacle. The distance measuring portion 17 may detect an obstacle (an object) which approaches the vehicle 1 in a case where the obstacle (the object) approaches the vehicle 1 beyond a predetermined distance to measure a distance to such obstacle. Specifically, the distance measuring portions 17a and 17d arranged at opposed sides in the rear of the vehicle 1 function as sensors (clearance sonars) which measure a distance between a rear corner portion of the vehicle 1 and the first obstacle (the adjacent vehicle) in a case where the vehicle 1 enters a space for parallel parking while moving rearward and further a distance between the rear corner portion of the vehicle 1 and the second obstacle (the wall, for example) after the vehicle 1 enters the space. The ECU 14 may obtain whether the object such as the obstacle positioned around the vehicle 1 exists and a distance to such object based on detection results of the distance measuring portions 16 and 17. That is, each of the distance measuring portions 16 and 17 serves as an example of a detection portion detecting the object. The distance measuring portions 17 are used for the detection of the object in a relatively close range, for example, while the distance measuring portions 16 are used for the detection of the object in a relatively distant range, for example, as compared to the distance measuring portion 17. In addition, the distance measuring portions 17 are usable for the detection of the object at a front side and a rear side of the vehicle 1. The distance measuring portions 16 are usable for the detection of the object at lateral sides of the vehicle 1. Each of the distance measuring portions 17 may function as a proximity sensor detecting that the object (obstacle) approaches within a predetermined distance.

As illustrated in FIG. 4, a surroundings monitoring system 100 (surroundings monitoring apparatus) includes, in addition to the ECU 14, the monitor device 11, the steering system 13 and the distance measuring portions 16, 17, a brake system 18, a steering angle sensor 19, an accelerator sensor 20, a shift sensor 21 and a wheel speed sensor 22, for example, which are electrically connected to one another via an in-vehicle network 23 serving as an electrical communication line. The in-vehicle network 23 is constituted as a CAN (controller area network), for example. The ECU 14 transmits a control signal through the in-vehicle network 23 to control the steering system 13 and the brake system 18, for example. In addition, the ECU 14 may receive, via the in-vehicle network 23, detection results of the torque sensor 13b, a brake sensor 18b, the steering angle sensor 19, the distance measuring portions 16, the distance measuring portions 17, the accelerator sensor 20, the shift sensor 21 and the wheel speed sensor 22, for example, and an operation signal of the operation input portion 10, for example.

The ECU 14 includes a CPU 14a (central processing unit), a ROM 14b (read only memory), a RAM 14c (random access memory), a display control portion 14d, an audio control portion 14e and an SSD 14f (solid state drive, flash memory), for example. The CPU 14a performs various calculation processing and controls including the image processing related to the image displayed at each of the display units 8 and 12, decision of a target moving position (a target parking position, a target position) of the vehicle 1, calculation of a guidance path (a guidance path, a parking path, a parking guidance path) of the vehicle 1, determination of whether the vehicle 1 interferes with the object, an automatic control of the vehicle 1 and cancellation of the automatic control. The CPU 14a reads out program installed and stored at a non-volatile memory unit such as the ROM 14b, for example, so as to perform the calculation processing based on the aforementioned program. The RAM 14c temporarily stores various data used for the calculation at the CPU 14a. The display control portion 14d mainly performs synthesis of the image data displayed at the display unit 8, for example, in the calculation processing at the ECU 14. The audio control portion 14e mainly performs processing on audio data output from the audio output unit 9 in the calculation processing at the ECU 14. The SSD 14f, which serves as a rewritable non-volatile memory portion, may store data even in a case where a power source of the ECU 14 is turned off. The CPU 14a, the ROM 14b and the RAM 14c, for example, may be accumulated within the same package. The ECU 14 may be constructed to include, in place of the CPU 14a, the other logic calculation processor or logic circuit such as a DSP (digital signal processor), for example. In addition, an HDD (hard disk drive) may be provided in place of the SSD 14f. Further, the SSD 14f or the HDD may be provided separately from the ECU 14.

The brake system 18 is an ABS (anti-lock brake system) for restraining locking of the brake, an antiskid brake system (ESC: electronic stability control) for restraining skidding of the vehicle 1 upon cornering thereof, an electric brake system for improving a brake force (for performing brake assist) or a BBW (brake by wire), for example. The brake system 18 applies a braking force to the wheels 3 and further the vehicle 1 via an actuator 18a. The brake system 18 may perform various controls by detecting locking of the brake, spin of the wheel 3 and a sign of skidding based on a rotational difference between the left and right wheels 3, for example. The brake sensor 18b is a sensor detecting a position of a movable portion of the braking operation portion 6, for example. The brake sensor 18b may detect the position of the brake pedal as the movable portion. The brake sensor 18b includes a displacement sensor.

The steering angle sensor 19 is a sensor detecting a steering amount of the steering portion 4 such as a steering wheel, for example. The steering angle sensor 19 is constituted using a Hall element, for example. The ECU 14 performs various controls by obtaining the steering amount of the steering portion 4 by the driver and the steering amount of each of the wheels 3 at the time of automatic steering, for example, by the steering angle sensor 19. The steering angle sensor 19 detects a rotation angle of a rotation portion included in the steering portion 4. The steering angle sensor 19 serves as an example of an angle sensor.

The accelerator sensor 20 is a sensor detecting a position of a movable portion of the accelerating operation portion 5, for example. The accelerator sensor 20 may detect the position of the accelerator pedal serving as the movable portion. The accelerator sensor 20 includes a displacement sensor.

The shift sensor 21 is a sensor detecting a position of a movable portion of the speed change operation portion 7, for example. The shift sensor 21 may detect a position of a lever, an arm or a button, for example, serving as the movable portion. The shift sensor 21 may include a displacement sensor or may be constituted as a switch.

The wheel speed sensor 22 is a sensor detecting a rotation amount or the number of rotations per time unit of the wheel 3. The wheel speed sensor 22 outputs the number of wheel speed pulses indicating the detected number of rotations as a sensor value. The wheel speed sensor 22 may be constituted using the Hall element, for example. The ECU 14 calculates a moving amount of the vehicle 1 based on the sensor value acquired from the wheel speed sensor 22 to perform various controls. The wheel speed sensor 22 may be provided at the brake system 18. In this case, the ECU 14 obtains the detection result of the wheel speed sensor 22 via the brake system 18.

The aforementioned constructions, arrangements and electric connections of the various sensors and actuators are examples and may be variously specified or changed.

The ECU 14 achieves a surroundings monitoring system. Specifically, the ECU 14 generates an image including the vehicle 1 at a center, the vehicle 1 being viewed from far (viewpoint converted image). Then, with the aforementioned viewpoint converted image, a virtual viewpoint is moved from one side of the vehicle 1 (for example, a front region) to an opposite side of the vehicle 1 (for example, a rear region) through an overhead region of the vehicle 1 so as to obtain a substantial moving image display. Such display makes the user easily recognize a positional relationship between the vehicle 1 and the object existing in the surroundings of the vehicle 1, the posture and the size of the object, for example.

Figure 5:
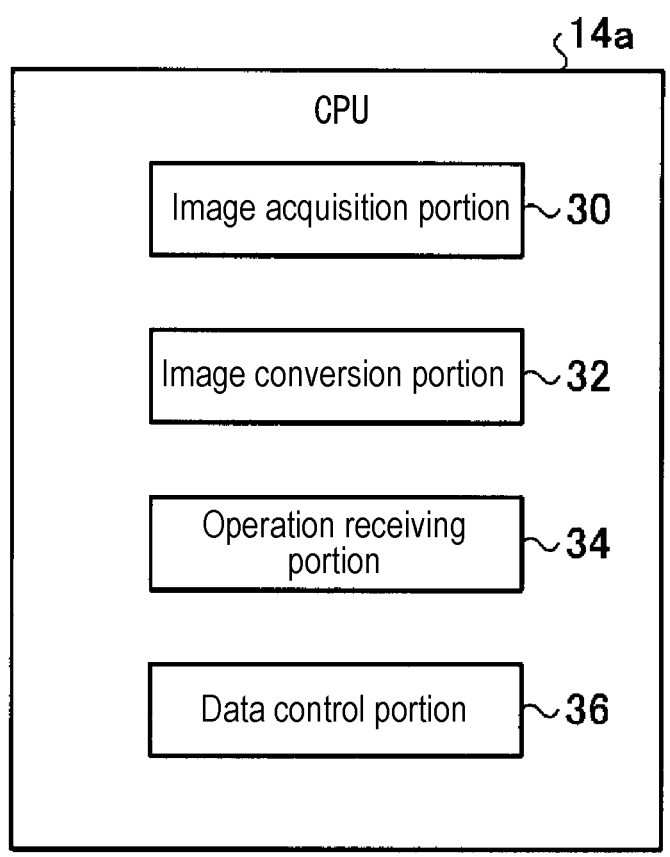
FIG. 5 is a block diagram illustrating an example of a construction of a control portion for displaying a viewpoint conversion image which is realized within an ECU of the surroundings monitoring apparatus according to the embodiment.

In order to realize the substantial moving image display with the viewpoint converted image, the CPU 14*a* included in the ECU 14 includes an image acquisition portion 30, an image conversion portion 32, an operation receiving portion 34 and a data control portion 36 (control portion), for example, as illustrated in FIG. 5. The CPU 14*a* performs the image processing using the captured image data obtained at the imaging portions 15, for example. The image acquisition portion 30, the image conversion portion 32, the operation receiving portion 34 and the data control portion 36 are realizable by reading out program installed and stored at the memory unit such as the ROM 14*b*, for example, and performing the program.

The image acquisition portion 30 acquires the captured image data output from the imaging portions 15 which are provided at the vehicle 1 to capture the images of the surroundings of the vehicle 1 via the display control portion 14*d*. The display control portion 14*d* may directly output the captured image data captured by the imaging portions 15 to the display unit 8 or the display unit 12. In this case, the user may choose a desired display using an input device such as an operation portion 14*g*. That is, the display control portion 14*d* selectively displays the image chosen by the operation of the operation portion 14*g*. For example, the display control portion 14*d* may display a rear image of the vehicle 1 captured by the imaging portion 15*a* or a left-side image captured by the imaging portion 15*d*, for example.

The image conversion portion 32 converts the captured image data acquired by the image acquisition portion 30 to the virtual image data with the plural viewpoints serving as the imaging directions towards the vehicle 1 which is viewed from far. The conversion to the virtual image data with the virtual viewpoints may be performed by known various processing methods. As an example, the image conversion portion 32 generates the virtual image data (viewpoint conversion image) where an environment outside and around the vehicle 1 is viewed from a viewpoint position apart from the vehicle 1 and facing the vehicle 1 based on the captured image data showing the outside environment of the vehicle 1 captured by the imaging portions 15 and conversion information of mapping table stored at the ROM 14*b*, for example. According to the present embodiment, the ROM 14*b* holds plural types of conversion information (mapping table) beforehand for obtaining the virtual image data obtainable in a case where the virtual viewpoint facing the vehicle 1 on a semicircular locus moves, the semicircular locus including several meters of radius (for example, five meters) with reference to the vehicle 1. The conversion information of the mapping table is desirably prepared per position of each of the virtual viewpoints. According to the present embodiment, the viewpoint conversion image is desirably displayed with continuous smooth moving image. Thus, the conversion information of the mapping table is prepared so that the virtual image data may be generated each time the virtual viewpoint moves by $\alpha°$, for example. In a case where the number of conversion information of the mapping table increases, the number of generated virtual image data (the number of frames) increases to thereby generate the smooth moving image. Nevertheless, processing load of the CPU 14*a* tends to increase. On the contrary, in a case where the number of conversion information of the mapping table decreases, the number of generated virtual image data decreases to deteriorate quality of the moving image. Nevertheless, the processing load of the CPU 14*a* may be reduced. Therefore, depending on quality of the required viewpoint conversion image (substantial moving image), the number of conversion information of the mapping table may be decided. In a case where the number of conversion information of the mapping table decreases, the moving image may be corrected by interpolation based on previous and next virtual image data (correction of dropping frames), for example, when the moving image is generated.

The operation receiving portion 34 acquires a signal by the operation input to the operation portion 14*g*. The operation portion 14*g* is a pressing button or a switch, for example, so as to request or cancel the display of the viewpoint conversion image by the user. The operation receiving portion 34 may receive an ON signal of an ignition switch which is not illustrated so that the reception of the ON signal may be regarded as acquisition of the display request of the viewpoint conversion image. For example, prior to starting of the vehicle 1 by the user getting in the vehicle 1 and turning on the ignition switch, the viewpoint conversion image may be automatically displayed so that a state of surroundings of the vehicle 1 may be notified to the user.

Figure 6:
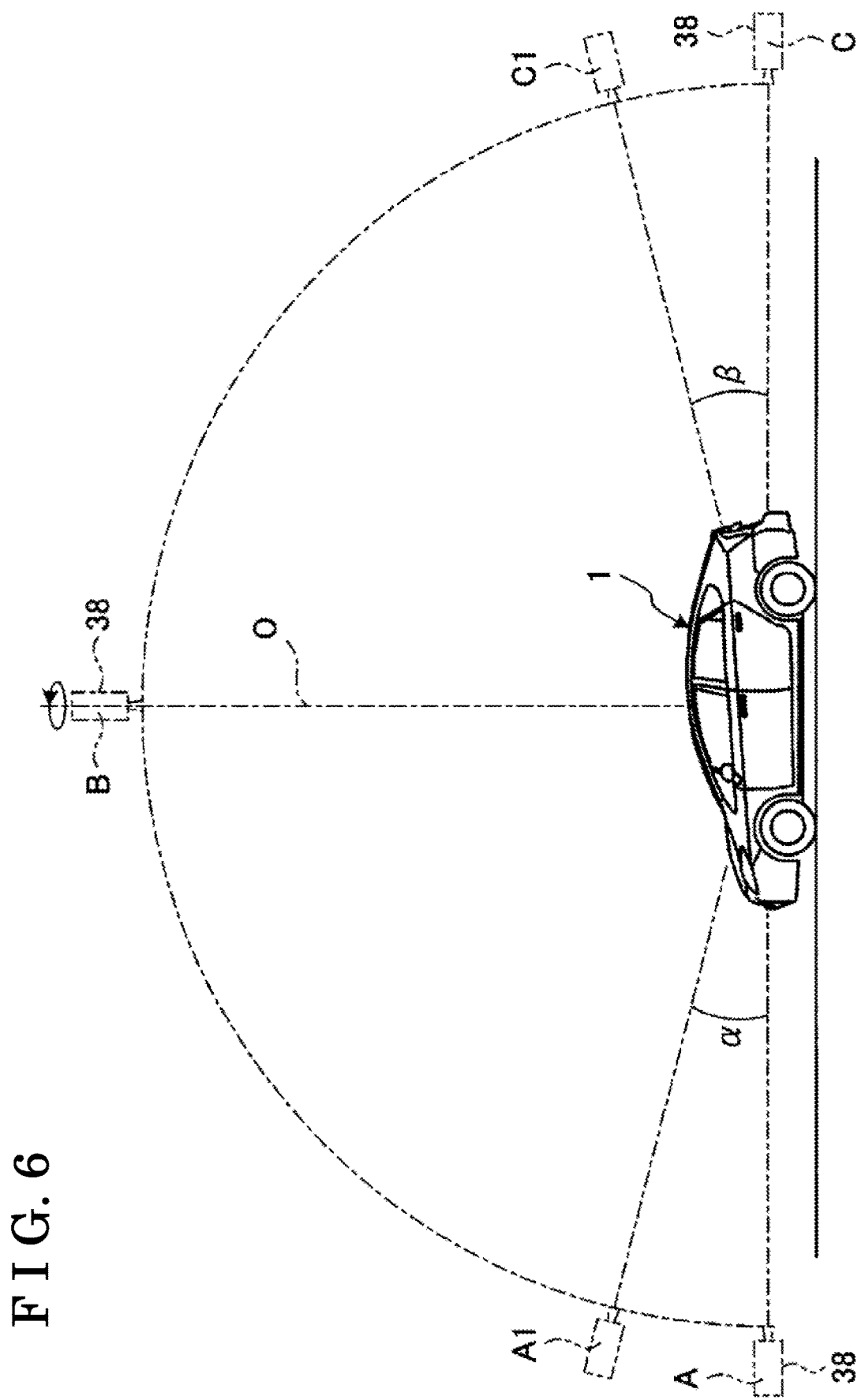
FIG. 6 is an explanatory view explaining an example of a movement of a virtual viewpoint at the surroundings monitoring apparatus according to the embodiment.

The data control portion 36 arranges plural virtual image data generated by the image conversion portion 32 so as to obtain a moving image where the virtual viewpoint moves around the vehicle 1 and supplies the resulting image to the display control portion 14*d* to be displayed at the display unit 8. As illustrated in FIG. 6, for example, the data control portion 36 prepares for displaying the virtual image data so that a virtual viewpoint 38 moves sequentially from a first virtual viewpoint position A, through a second virtual viewpoint position B, and to a third virtual viewpoint position C. The first virtual viewpoint position A is a position at which an opposite side (the other side) of the vehicle 1 is viewed beyond the vehicle 1 from one side of the vehicle 1. FIG. 6 illustrates an example where the first virtual viewpoint position A is specified at the front side of the vehicle 1. The second virtual viewpoint position B is a position at which the vehicle 1 is viewed from the overhead region of the vehicle 1. The third virtual viewpoint position C is a position at which one side of the vehicle 1 is viewed beyond the vehicle 1 from the other side of the first virtual viewpoint position A. FIG. 6 illustrates an example where the third virtual viewpoint position C is specified at the rear side of the vehicle 1.

The data control portion 36 rotates the virtual image data relative to a line of sight of the virtual viewpoint 38 (a line of sight towards the vehicle 1 from the overhead region of the vehicle 1, i.e., a vertical axis O, for example) while the virtual image data is being displayed so that the virtual viewpoint 38 passes through the second virtual viewpoint position B. In a case where the virtual viewpoint 38 moves from the first virtual viewpoint position A to the third virtual viewpoint position C, an up-down direction of an object which exists around the vehicle 1 is reversed around a time point at which the virtual viewpoint 38 passes through the second virtual viewpoint position B when the virtual image data is continuously displayed without change. As a result, it may be difficult to grasp the position or posture of the object. Therefore, the data control portion 36 rotates the virtual image data by 180° at a position directly above the vehicle 1 at which entire surroundings of the vehicle 1 are overlooked (i.e., at the second virtual viewpoint position B). As a result, even after the virtual viewpoint 38 passes through the second virtual viewpoint position B, the up-down direction of the object is the same as the direction in which the object is displayed at the first virtual viewpoint position A so that the state of the surroundings of the vehicle 1 is easily grasped. While decrease in recognition of the positional relationship of the object relative to the vehicle 1 is restrained, the image may be smoothly shifted to the third virtual viewpoint position C. That is, because the up-down direction is appropriately indicated in a case where the image by the virtual image data is displayed at the third virtual viewpoint position C, reproducibility of actual world may improve. In addition, because the display position of the object which exists in the surroundings of the vehicle 1 changes in association with the rotation of the virtual image data, the existence of the object may easily draw the attention to thereby improve awareness of the object. That is, the presence of the object may be easily recognized. The position directly above the vehicle 1 at which the entire surroundings of the vehicle 1 are overlooked may correspond to a position on a vertical extension line of the front bumper of the vehicle 1, a position on a vertical extension line of a roof, a position on a vertical extension line of a rear bumper, or a position therebetween. Among the aforementioned positions, the position on the vertical extension line of the roof is desirable because the positional relationship between the vehicle 1 and the object may be easily grasped in the display and an eccentric rotation of the vehicle 1 is small when the virtual image data is rotated, so that the object is displayed without giving uncomfortable feeling, for example.

The virtual image data is generated on a basis of the captured image data captured by the imaging portions 15 mounted at the vehicle 1. Thus, the captured image data may include only a portion of the own vehicle (vehicle 1). For example, the captured image data may include only a portion of the bumper or a portion of the door. As a result, the virtual image data generated on a basis of the captured image data may not reflect the entire vehicle 1. Therefore, the data control portion 36 may display so that the vehicle 1 exists on the viewpoint conversion image displayed at the display unit 8 by superimposing vehicle outline data of the own vehicle (vehicle 1) which is stored beforehand at the ROM 14b or the SSD 14f, for example, on the virtual image data. As a result, the positional relationship between the object which exists in the surroundings of the vehicle 1 (own vehicle) and the vehicle 1 may be displayed so as to be easily understood by the user. Because how the vehicle 1 looks changes from moment to moment in conjunction with the movement of the virtual viewpoint 38, the vehicle outline data may be desirably prepared so as to conform to the number of conversion information of the mapping table.

The vehicle outline data may be generated with photographed data of the actual vehicle 1 or obtained by animation. In addition, the vehicle outline data may be obtained by the vehicle 1 expressed in translucent or diagrammatic view, for example. In a case where the vehicle 1 is expressed in translucent or diagrammatic view, existence, configuration and size, for example, of the object which exists at the rear side of the vehicle may be easily grasped. On the other hand, in a case where the vehicle outline data is displayed in real expression, a difference from the actual world (actual space) is reduced, which may provide the image easily accepted by the user.

The data control portion 36 may determine a movement start position beforehand when moving the virtual viewpoint 38. The data control portion 36 may determine to position the third virtual viewpoint position C at the rear side relative to an expected travelling direction of the vehicle 1 in a case where the vehicle 1 is started, for example. FIG. 6 illustrates setting positions of the first virtual viewpoint position A, the second virtual viewpoint position B and the third virtual viewpoint position C in a case where the vehicle 1 is started forward. On the other hand, in a case where the vehicle 1 is started rearward, the first virtual viewpoint position A is specified at the rear side of the vehicle 1 while the third virtual viewpoint position C is specified at the front side of the vehicle 1. The third virtual viewpoint position C is specified in the aforementioned manner so that the image in an observing direction where attention may be ultimately paid to for starting the vehicle 1 may be provided at the end. Thus, the display which brings the user to easily understand the state of the surroundings of the vehicle 1 is obtainable.

The data control portion 36 may determine the expected travelling direction of the vehicle 1 upon starting thereof by storing the position of the speed change operation portion 7 immediately before the ignition switch of the vehicle 1 is turned off, i.e., immediately before parking the vehicle, at the SSD 14f, for example. In a case where the vehicle is parked after the rearward driving with the position of the speed change operation portion 7 in R range immediately before the ignition switch is turned off, the vehicle 1 is highly possibly started forward when starting from the parked state. Therefore, the third virtual viewpoint position C is desirably specified at the rear side so the state in the front of the vehicle 1 is easily recognizable at the end of the viewpoint conversion image. On the contrary, in a case where the vehicle is parked after the forward driving with the position of the speed change operation portion 7 in D range immediately before the ignition switch is turned off, the vehicle 1 is highly possibly started rearward when starting from the parked state. Therefore, the third virtual viewpoint position C is desirably specified at the front side so that the state in the rear of the vehicle 1 is easily recognizable at the end of the viewpoint conversion image. In a case where the vehicle 1 is parked with a parking assist system, the ECU 14 of the vehicle 1 may store an approach direction of the vehicle 1 when the vehicle 1 is parked or a leaving direction when the vehicle 1 gets out of a garage. In this case, the expected travelling direction of the vehicle 1 upon starting of the vehicle 1 may be determined on a basis of information at the time of parking assist stored at the SSD 14f. During the parking of the vehicle 1, the state of the surroundings of the vehicle 1 may change so that the expected travelling direction for the start of the vehicle 1 should be changed. In this case, the data control portion 36 may cause the display unit 8 or the display unit 12 to display a message for asking the user the travelling direction of the vehicle 1 in a case where the ignition switch is turned on, so that the user may input to the operation portion 14g the expected travelling direction, i.e., a direction from which and to which the viewpoint conversion image is desirably viewed.

In FIG. 6, as an example, the first virtual viewpoint position A is set at the front side of the vehicle 1. The second virtual viewpoint position B is set at the overhead region of the vehicle 1. The third virtual viewpoint position C is set at the rear side of the vehicle 1. The setting positions of the first virtual viewpoint position A and the third virtual viewpoint position C may be appropriately chosen as long as the virtual image data is rotatable by 180° around a vertical axis O at the second virtual viewpoint position B (at the overhead region of the vehicle 1), for example, which may obtain the same effect. For example, according to another embodiment, the viewpoint conversion image (substantial moving image) may be displayed in a state where the first virtual viewpoint position A is set at a right side of the vehicle 1, the second virtual viewpoint position B is set at the overhead region of the vehicle 1, and the third virtual viewpoint position C is set at a left side of the vehicle 1. In this case, surroundings monitoring information which brings attention to the state at the lateral side of the vehicle 1 may be provided. In addition, the first virtual viewpoint position A may be set at a diagonally forward left of the vehicle 1 and the third virtual viewpoint position C may be set at a diagonally rearward right of the vehicle 1 with the second virtual viewpoint position B being set at the overhead region of the vehicle 1. In the same manner, the first virtual viewpoint position A may be set at a diagonally forward right of the vehicle 1 and the third virtual viewpoint position C may be set at a diagonally rearward left with the second virtual viewpoint position B being set at the overhead region of the vehicle 1. In this case, surroundings monitoring information which brings attention to the state at corner portions of the vehicle 1 may be provided.

Figure 7:
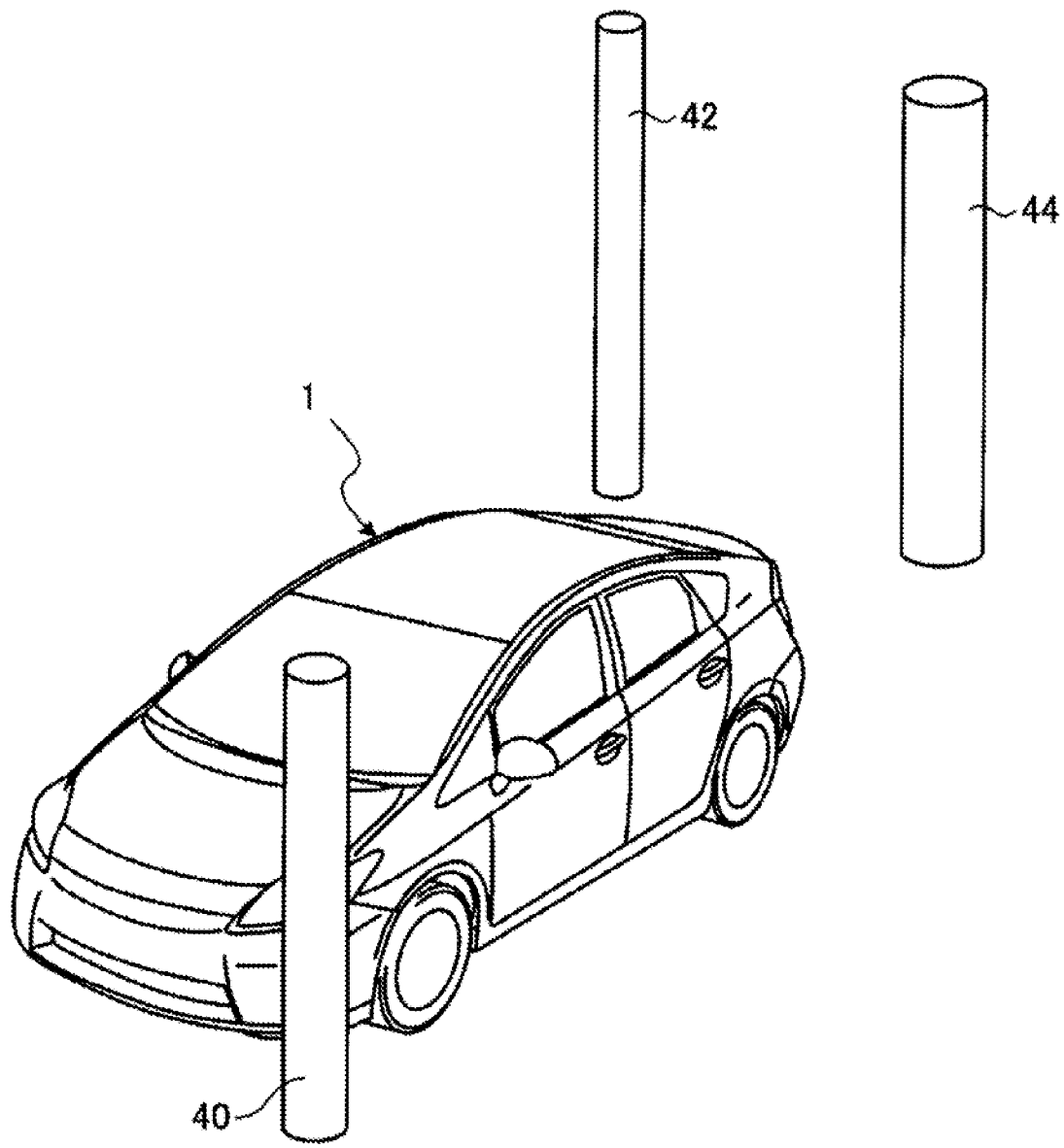
FIG. 7 is an explanatory view explaining an example of a state around the vehicle at which the surroundings monitoring apparatus according to the embodiment is mounted.
Figure 8:
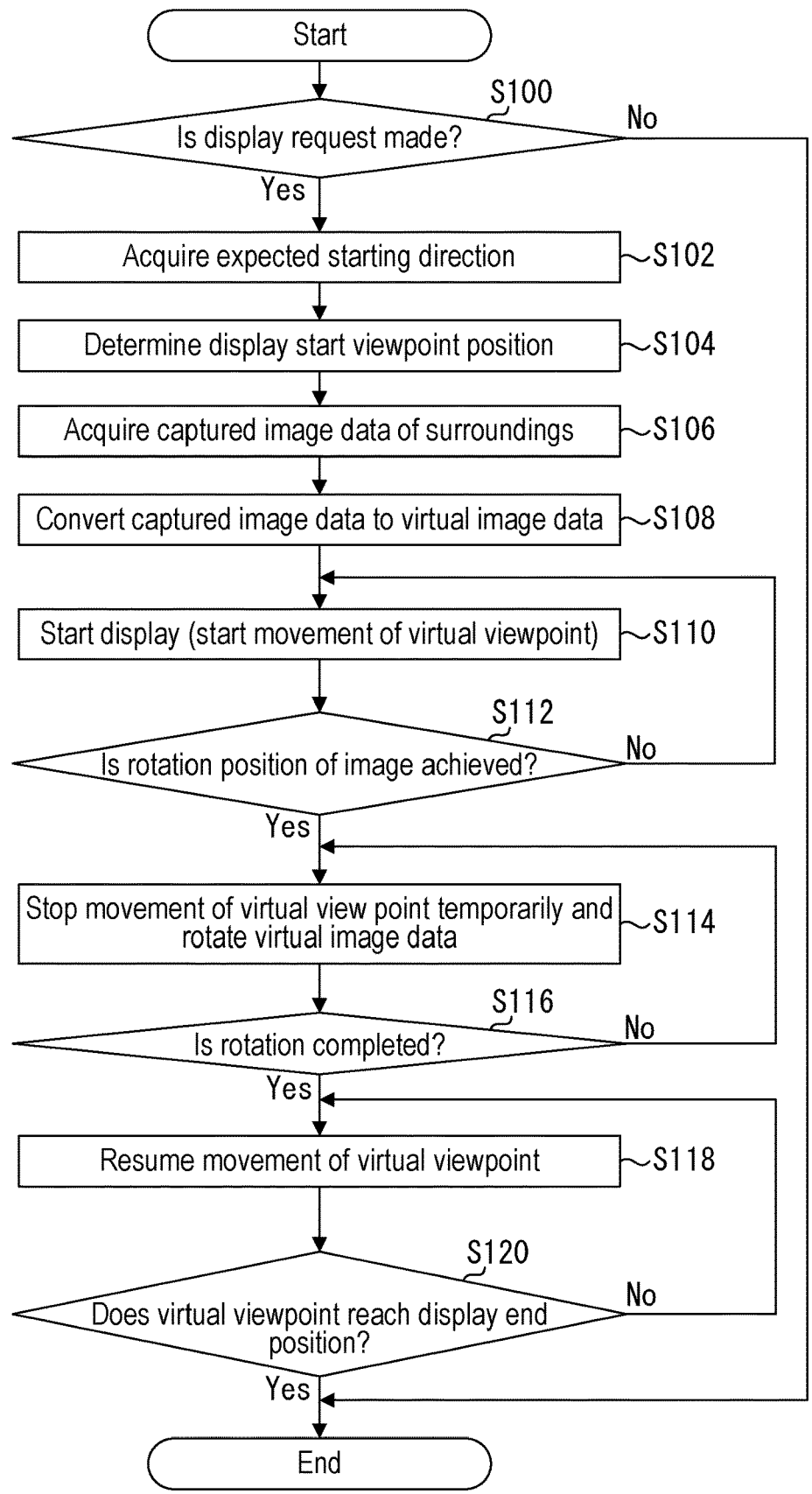
FIG. 8 is a flowchart explaining an example of a display processing performed by the surroundings monitoring apparatus according to the embodiment.

An operation of the surroundings monitoring system 100 constructed in the aforementioned manner is explained below. FIG. 7 is a perspective view illustrating an example of the actual world (actual space) where the vehicle 1 is parked. In the example of FIG. 7, the vehicle 1 is parked at a space disposed between an object 40 at the front side and objects 42 and 44 at the rear side. Each of the objects 40 and 42 is a column object with a small diameter while the object 44 is a column object with a larger diameter than the objects 40 and 42. In the following explanation, processing of displaying the viewpoint conversion image in a case where the vehicle 1 is started forward from the state illustrated in FIG. 7 is explained as an example.

The CPU 14a (the ECU 14) first determines whether or not a display request of the viewpoint conversion image is made (S100). For example, the CPU 14a confirms an operation state of the ignition switch and, in a case where the ignition switch is turned on, determines that the vehicle 1 is in preparation for starting and the display request is made. In this case, the viewpoint conversion image is displayed in an automatic display mode in association with the operation of the ignition switch. According to another embodiment, it is determined that the display request is made in a case where the user requests the display of the viewpoint conversion image via the operation portion 14g, for example. In this case, the viewpoint conversion image is displayed in a manual display mode.

The CPU 14a terminates the present flow in a case of determining that the display request is not made (No in S100). On the other hand, in a case where the CPU 14a determines that the display request is made (Yes in S100), the data control portion 36 acquires an expected starting direction of the vehicle 1 (S102). The data control portion 36 obtains the expected starting direction of the vehicle 1 based on the shift position of the speed change operation portion 7 immediately before the parking which is stored at the SSD 14f, for example, or a parking state when the parking assist is performed, for example. The data control portion 36 determines a display start viewpoint position based on the expected starting direction which is obtained as above (S104). For example, in a case where the vehicle 1 is determined to start forward, the data control portion 36 specifies the third virtual viewpoint position C at the rear side of the vehicle 1 and specifies the first virtual viewpoint position A at the front side of the vehicle 1. On the contrary, in a case where the vehicle 1 is determined to start rearward, the data control portion 36 specifies the third virtual viewpoint position C at the front side of the vehicle 1 and specifies the first virtual viewpoint position A at the rear side of the vehicle 1.

Next, the image acquisition portion 30 acquires the captured image data (present image) of the surroundings of the vehicle 1 captured by the imaging portions 15a to 15d via the display control portion 14d (S106). The image conversion portion 32 then generates (converts) the virtual image data with the conversion information of the mapping table stored at the ROM 14b based on the captured image data acquired as above (S108). In the present embodiment, the image conversion portion 32 converts the captured image data to the virtual image data so that the captured image data is projected on a curved surface with reference to the position of the vehicle 1.

Figure 9:
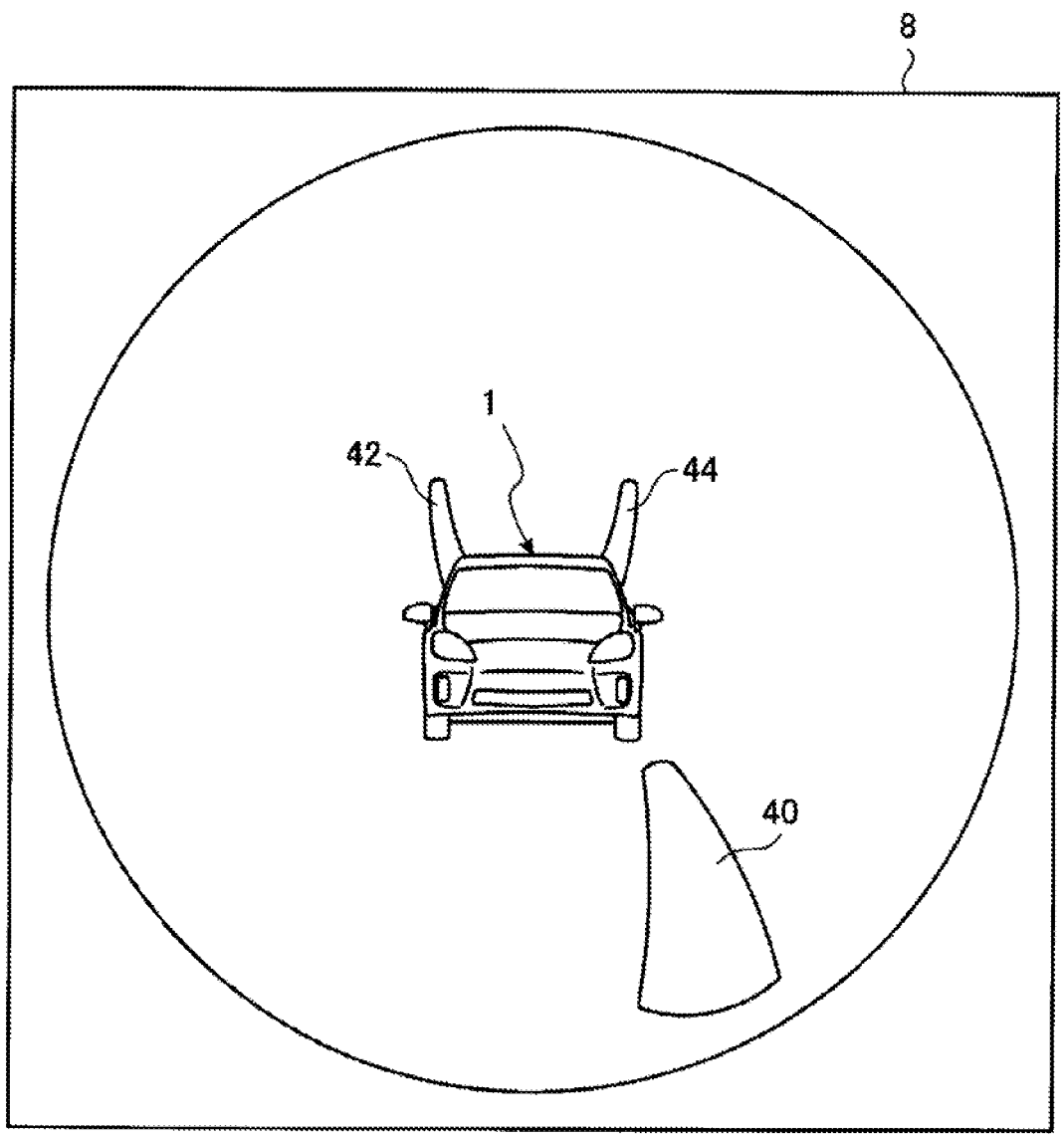
FIG. 9 is a display example of a curved projection at the surroundings monitoring apparatus according to the embodiment displayed at a display unit using virtual image data at a first virtual viewpoint position.

The data control portion 36 starts displaying the virtual image data in a case where the virtual viewpoint 38 exists at the display start viewpoint position (for example, at the first virtual viewpoint position A in FIG. 6) decided in S104. The data control portion 36 sequentially displays the virtual image data at a predetermined frame rate so that the virtual viewpoint 38 moves towards the second virtual viewpoint position B, thereby starting displaying the substantial moving image of the viewpoint conversion image (S110). In the present embodiment, as mentioned above, the image conversion portion 32 generates the virtual image data with the curved projection on the captured image data. For example, in a case where the virtual image data is generated with a planar projection, setting the first virtual viewpoint position A in the horizontal direction relative to the vehicle 1 causes pixels corresponding to the object in the surroundings of the vehicle 1 to be arranged on a horizontal line (i.e., linearly expressed), which may lead to difficulty in expressing the object. On the other hand, in a case where the virtual image data is generated with the curved projection, setting the first virtual viewpoint position A in the horizontal direction relative to the vehicle 1 causes the object which exists at a position closer to the first virtual viewpoint position A to be displayed as lying on a road surface. In addition, the object existing at the rear side (at a side away from the first virtual viewpoint position A) is sterically expressed as a standing figure. FIG. 9 illustrates an example of the viewpoint conversion image obtained by the virtual image data with the curved projection in a case where the virtual viewpoint 38 exists at the first virtual viewpoint position A. In this case, the user may recognize that the object 40 exists in the front of the vehicle 1 and the object 42 exists in the rear of the vehicle 1.

Figure 10:
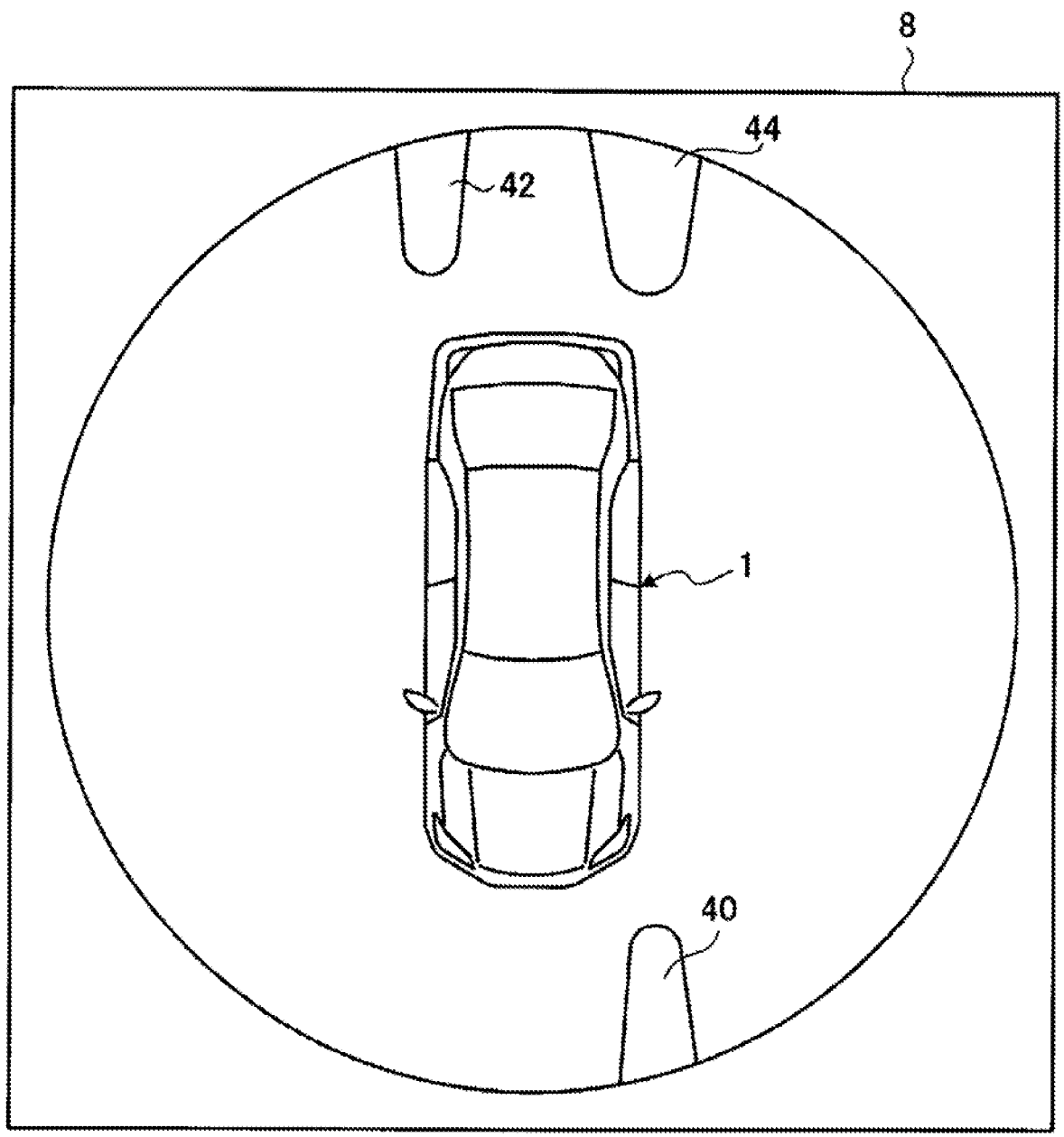
FIG. 10 is a display example of the curved projection at the surroundings monitoring apparatus according to the embodiment displayed at the display unit using the virtual image data where a virtual viewpoint is moved from the first virtual viewpoint position to a second virtual viewpoint position.
Figure 11:
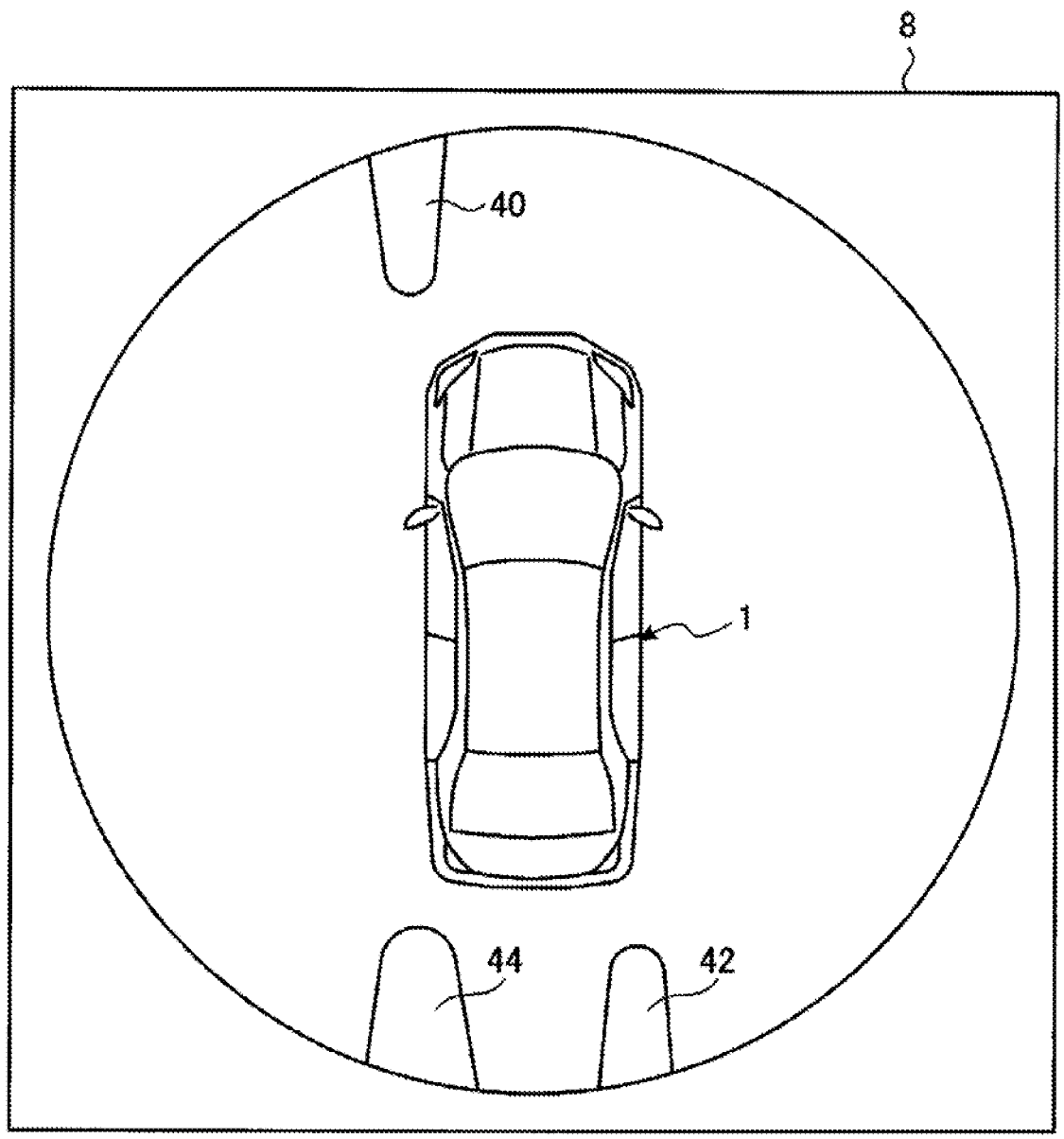
FIG. 11 is a display example of the curved projection at the surroundings monitoring apparatus according to the embodiment displayed at the display unit using the virtual image data where a rotation processing is performed at the second virtual viewpoint position so that a preparation for moving the virtual viewpoint to a third virtual viewpoint position is ready.

The data control portion 36 determines whether or not the virtual image data which is sequentially displayed (i.e., substantial moving image) reaches display timing at which the virtual image data is displayed at the second virtual viewpoint position B, i.e., at which the virtual image data is rotated by 180° around the vertical axis O (No in S112). In a case where the virtual image data reaches the position (timing) at which the virtual image data is rotated (Yes in S112), the data control portion 36 temporarily stops the movement of the virtual viewpoint 38 and rotates the virtual image data (S114). FIG. 10 illustrates the viewpoint conversion image displayed at the display unit 8 based on the virtual image data in a case where the virtual viewpoint 38 reaches the second virtual viewpoint position B. As illustrated in FIG. 10, before the rotation of the virtual image data, the front side of the vehicle 1 faces a lower end side of a screen of the display unit 8 and the object 40 exists at the lower end side of the screen of the display unit 8. In addition, the objects 42 and 44 exist at an upper end side of the screen of the display unit 8. FIG. 11 is the viewpoint conversion image displayed at the display unit 8 based on the virtual image data after the virtual viewpoint 38 is rotated at the second virtual viewpoint position B by 180° in the horizontal direction relative to the vertical axis O (see FIG. 6) after the virtual viewpoint 38 reaches the second virtual viewpoint position B. As illustrated in FIG. 11, after the rotation of the virtual image data, the rear side of the vehicle 1 faces the lower end side of the screen of the display unit 8 and the objects 42 and 44 exist at the lower end side of the screen of the display unit 8. In addition, the object 40 exists at the upper end side of the screen of the display unit 8. Accordingly, the virtual image data is rotated in a state where the entire state of the surroundings of the vehicle 1 is easily recognizable so that the user may easily recognize existence of each of the objects 40 to 44 and the positional relationship between each of the objects 40 to 44 and the vehicle 1. A degree of attention paid to the object may therefore increase.

The data control portion 36 confirms whether or not the rotation at the second virtual viewpoint position B by the data control portion 36 is completed (No in S116). In a case where the rotation is completed (Yes in S116), the data control portion 36 starts the movement of the virtual viewpoint 38 to the third virtual viewpoint position C (S118). Because the virtual image data is rotated by 180° at the second virtual viewpoint position B, the up-down direction of the vehicle 1 is inhibited from reversing even when the virtual viewpoint 38 moves to the third virtual viewpoint position C. Thus, in a case where the image by the virtual image data is displayed at the third virtual viewpoint position C, the image in the appropriate up-down direction is obtained to thereby improve reproducibility of the actual world.

Next, the data control portion 36 determines whether or not the position of the virtual viewpoint 38 reaches a display end position (No in S120). In a case where the virtual viewpoint 38 reaches the third virtual viewpoint position C (C1), i.e., the display of the virtual image data corresponding to the third virtual viewpoint position C (C1) is performed (Yes in S120), the CPU 14a (the operation receiving portion 34) terminates the present flow and waits for receiving next display request of the viewpoint conversion image.

The data control portion 36 may repeat displaying the viewpoint conversion image the predetermined number of times for one display request. In a case where the viewpoint conversion image is displayed multiple times, the new viewpoint conversion image may be displayed each time. That is, the viewpoint conversion image which changes on a real-time basis may be displayed. In this case, a sudden approach of the object, i.e., approach of a pedestrian, for example, may be reflected on the viewpoint conversion image so as to provide the state in the actual world to the user. In addition, in another embodiment, the viewpoint conversion image displayed for the first time may be stored at the RAM 14c, for example, and the viewpoint conversion image which is stored as above may be played and displayed from the second time or later. In this case, processing load of the CPU 14a may decrease.

The data control portion 36 may change (vary) a moving speed of the virtual viewpoint, i.e., a display speed of the moving image of the viewpoint conversion image. For example, the data control portion 36 may receive the display speed desired by the user via the operation portion 14g and set the display speed to the aforementioned desired display speed. In this case, the display suitable for the user's preference is obtainable. In a case where the display of the viewpoint conversion image is performed multiple times, the display at a normal first speed may be initially performed, and the display at a second speed slower than the first speed may be performed for the second time or later. In this case, the display where the state of the surroundings of the vehicle 1 is easily understood is obtainable.

Accordingly, the data control portion 36 moves the virtual viewpoint 38 continuously to the first virtual viewpoint position A, the second virtual viewpoint position B and the third virtual viewpoint position C when displaying the virtual image data, and rotates the virtual image data by 180° in the horizontal direction at the second virtual viewpoint position B. As a result, the user may be notified of the state of the surroundings of the vehicle 1 by the substantial moving image which is obtained by the viewpoint conversion image viewed from the virtual viewpoint 38. The state of the surroundings of the vehicle 1 (the actual world, the actual space) may be further easily grasped by the user. The position of the virtual viewpoint 38 continuously moves in a height direction and a direction from the first virtual viewpoint position A to the third virtual viewpoint position C so that how the object (for example, each of the objects 40 to 44) which exists in the surroundings of the vehicle 1 is looked changes from moment to moment. In the course of such change (continuous change), characteristics of the object (object in solid) become easily understood. Further, because the viewpoint conversion image is displayed continuously as the substantial moving image, changes of the form of the object may be easily grasped. That is, as compared to a case where the viewpoint conversion image is displayed intermittently or individually, the state of the surroundings of the vehicle 1 may be displayed so as to be easily understood by the user.

Figure 12:
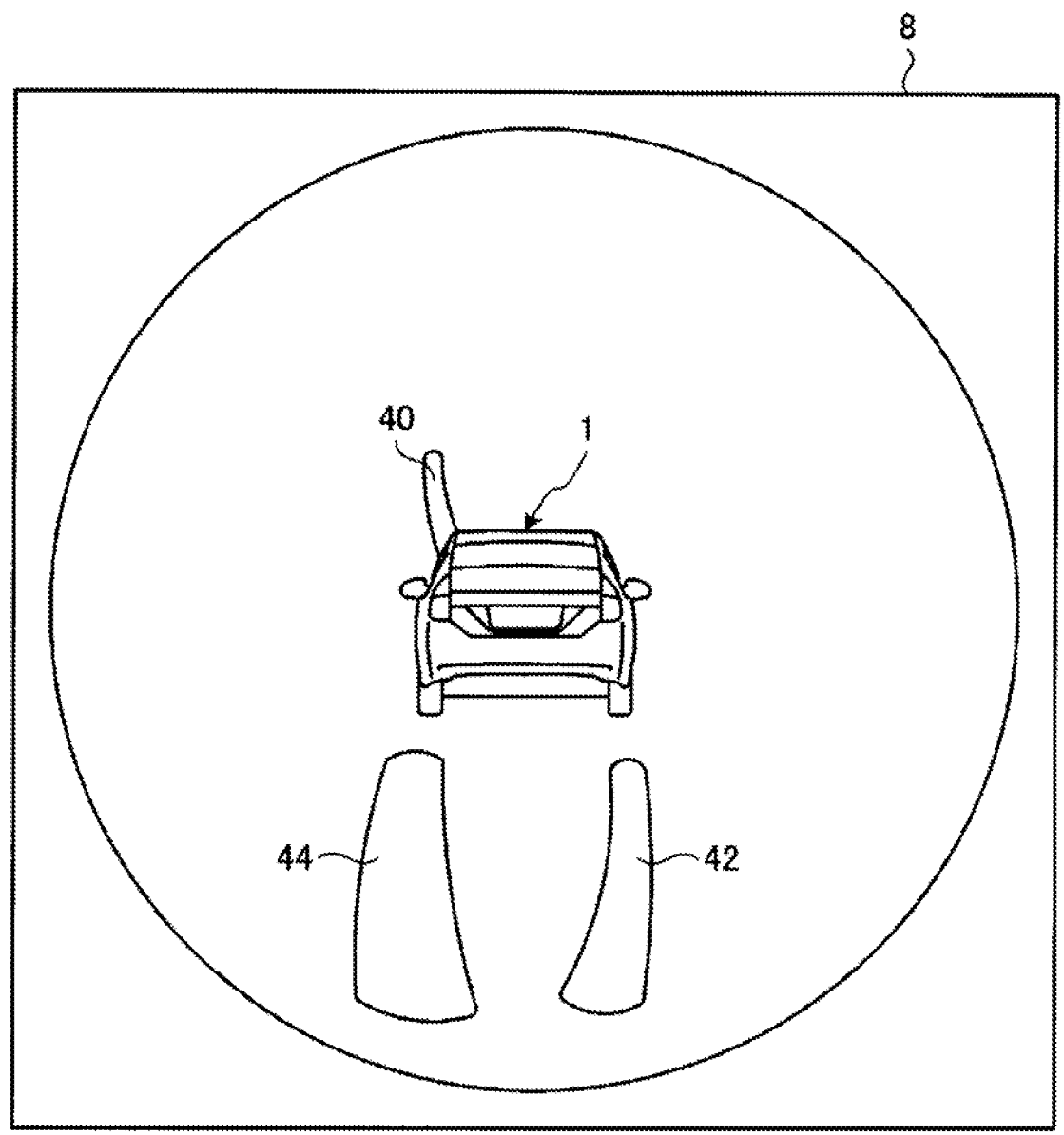
FIG. 12 is a display example of the curved projection at the surroundings monitoring apparatus according to the embodiment displayed at the display unit using the virtual image data at the third virtual viewpoint position.

The third virtual viewpoint position C is set to be positioned at the rear side relative to the expected travelling direction of the vehicle 1 when the vehicle 1 is started so as to terminate the display of the virtual image data. Thus, as illustrated in FIG. 12, the user may be easily impressed by the state in the travelling direction and may be alerted at the time of the vehicle start.

In a case where the image conversion portion 32 generates the virtual image data from the captured image data with the curved projection, the processing load of the CPU 14a may increase. On the other hand, in a case where the image conversion portion 32 generates the virtual image data from the captured image data with the planar projection, the processing load of the CPU 14a may decrease as compared to the curved projection. As mentioned above, in a case where the planar projection is employed, the display of the objection may be difficult when the virtual viewpoint 38 is positioned horizontally to the vehicle 1. Therefore, as illustrated in FIG. 6, a moving start position and a moving end position of the virtual viewpoint 38 are shifted above the position horizontal to the vehicle 1 to a first virtual viewpoint position A1 and a third virtual viewpoint position C1. For example, an elevation angle of the first virtual viewpoint position A1 relative to the horizontal direction is defined to be α=15°, for example. In the same manner, an elevation angle of the third virtual viewpoint position C1 relative to the horizontal direction is defined to be β=15°, for example. Accordingly, the moving start position and the moving end position of the virtual viewpoint 38 are simply changed to thereby easily avoid inconvenience that the display of the object is difficult. Further, the processing load of the CPU 14a may be easily reduced.

Figure 13:
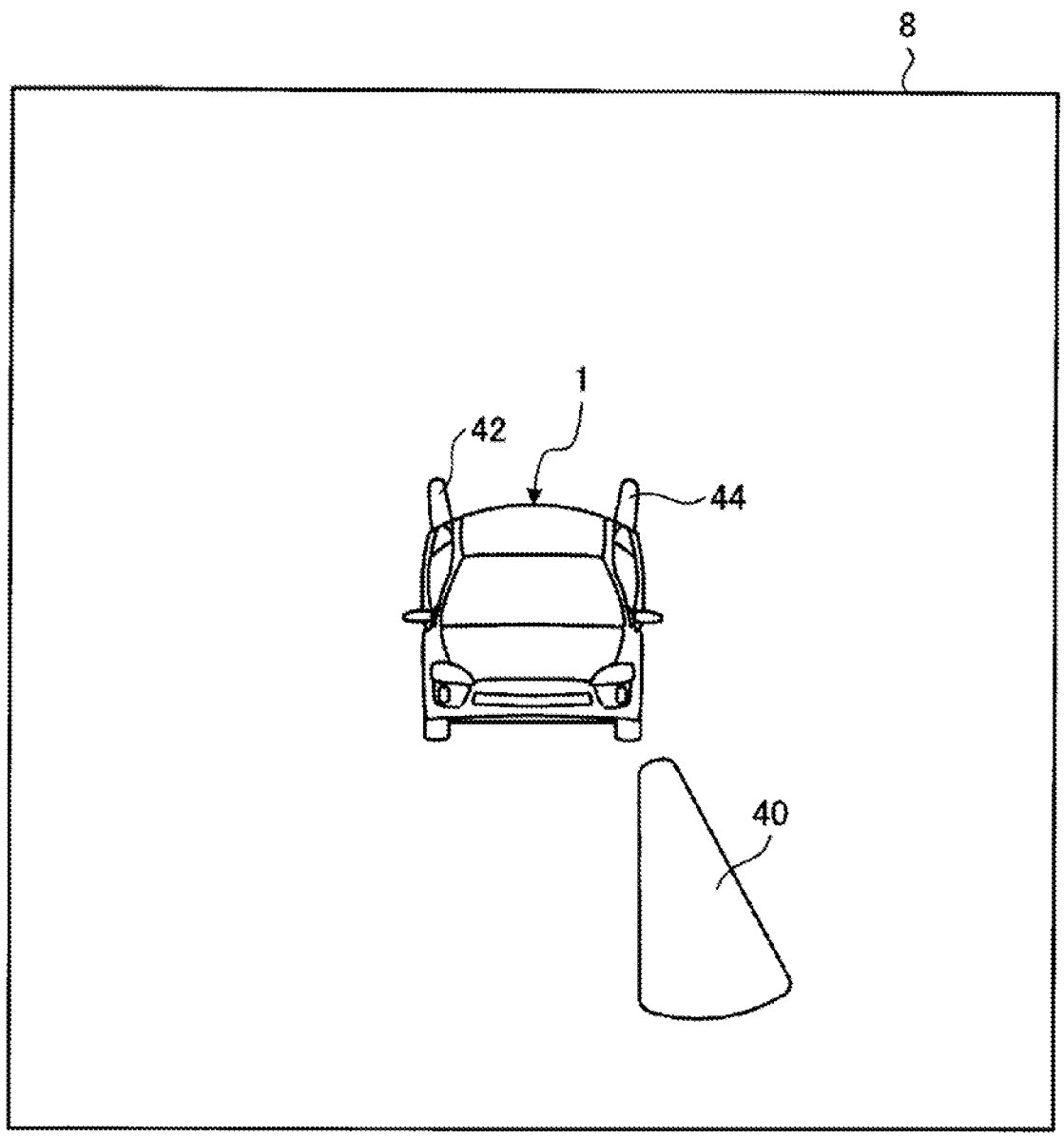
FIG. 13 is a display example of a planar projection at the surroundings monitoring apparatus according to the embodiment displayed at the display unit using the virtual image data at the first virtual viewpoint position.
Figure 14:
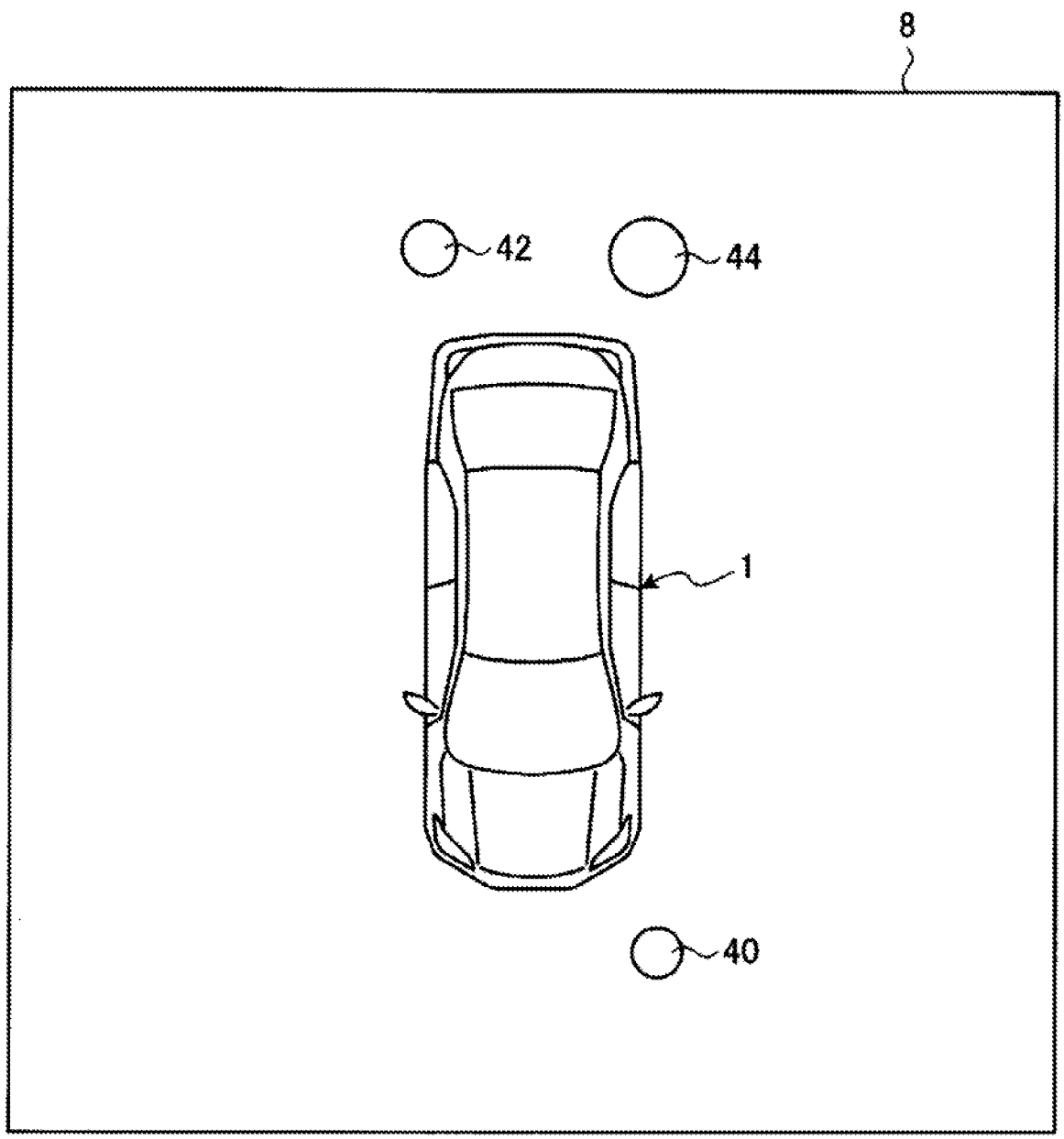
FIG. 14 is a display example of the planar projection at the surroundings monitoring apparatus according to the embodiment displayed at the display unit using the virtual image data where the virtual viewpoint is moved from the first virtual viewpoint position to the second virtual viewpoint position.
Figure 15:
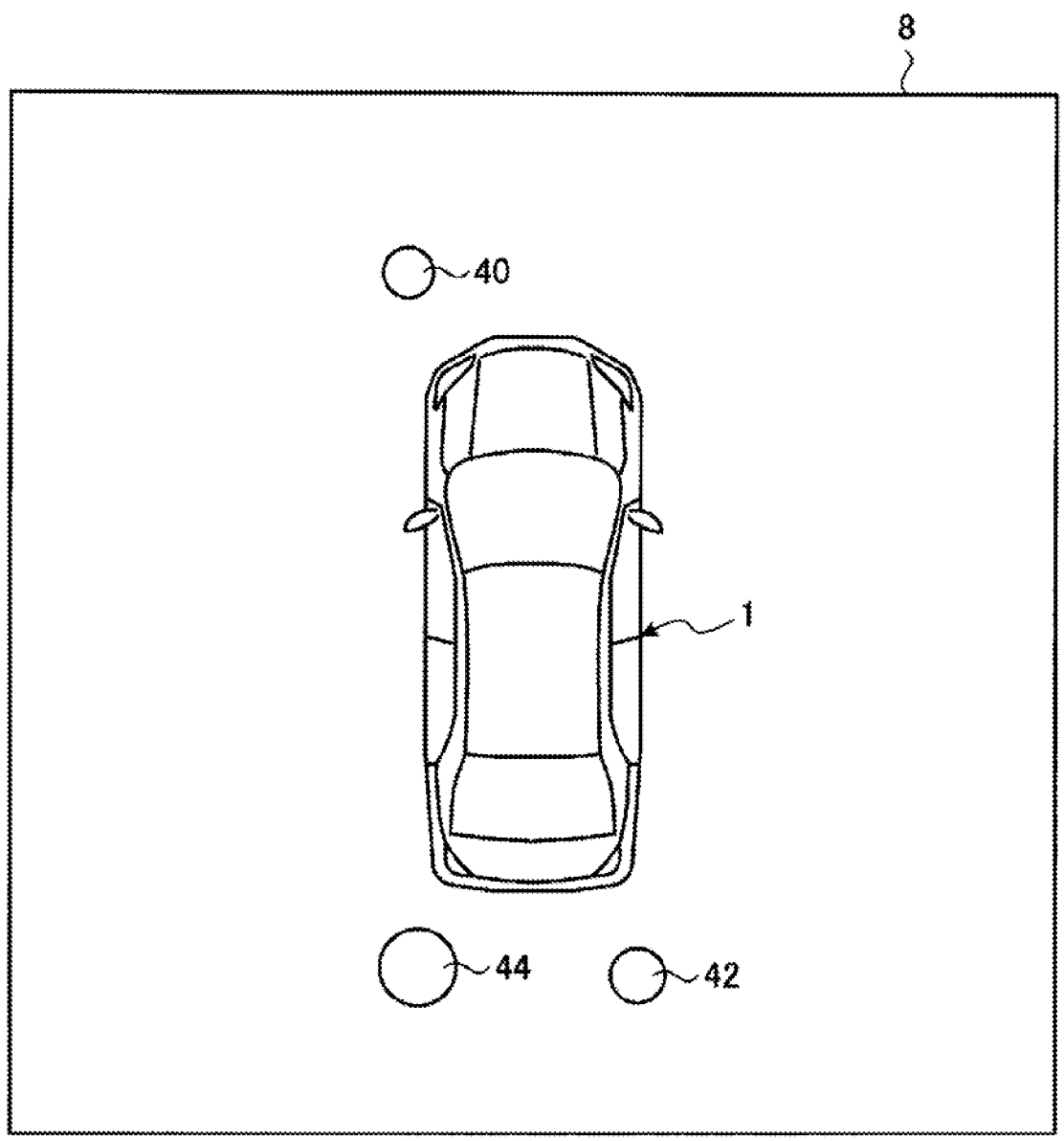
FIG. 15 is a display example of the planar projection at the surroundings monitoring apparatus according to the embodiment displayed at the display unit using the virtual image data where the rotation processing is performed at the second virtual viewpoint position so that a preparation for moving the virtual viewpoint to the third virtual viewpoint position is ready.
Figure 16:
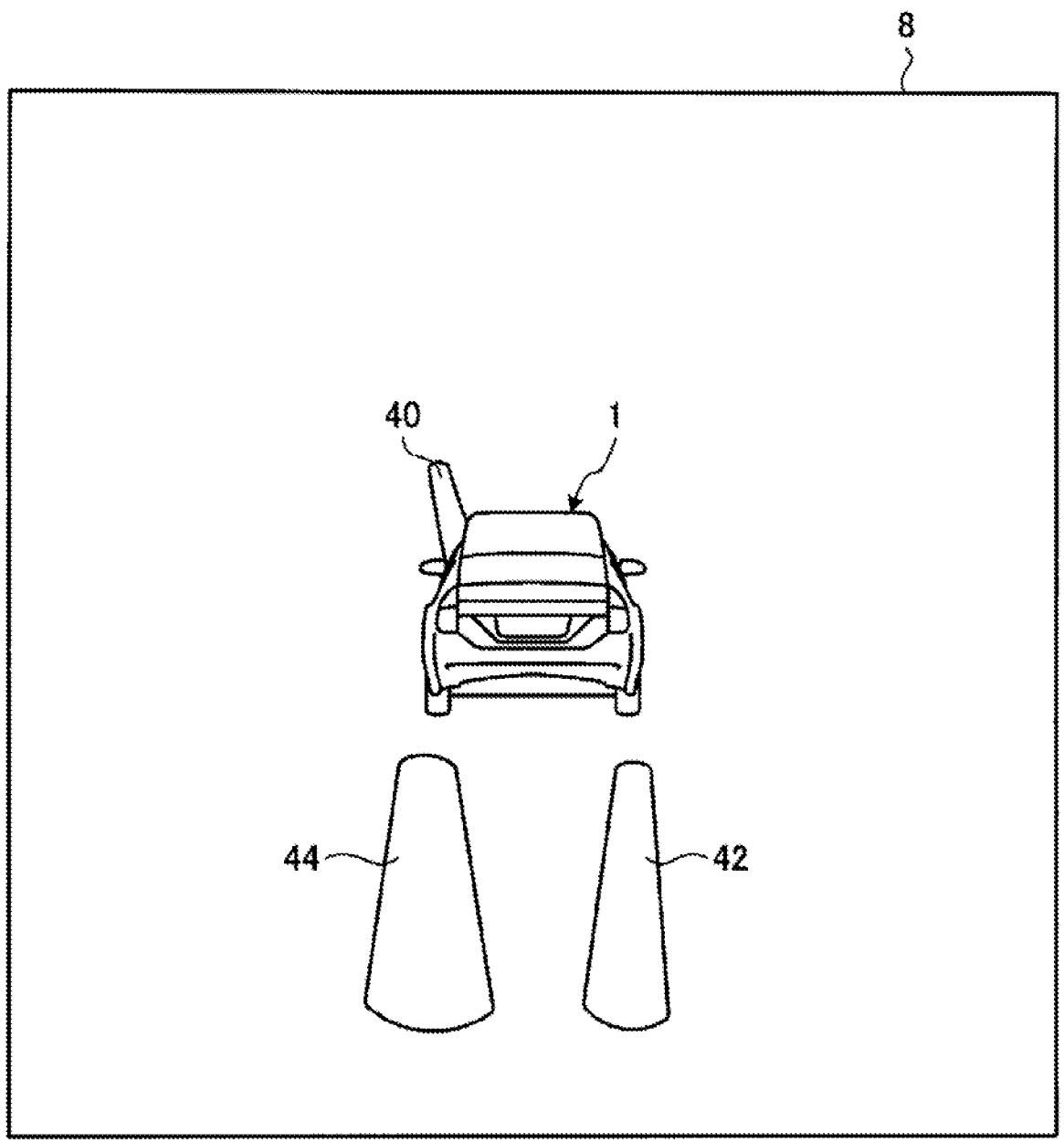
FIG. 16 is a display example of the planar projection at the surroundings monitoring apparatus according to the embodiment displayed at the display unit using the virtual image data at the third virtual viewpoint position.

Each of FIGS. 13 to 16 illustrates an example of display by the viewpoint conversion image with the virtual image data which is generated with the planar projection. As illustrated in FIG. 13, in a case where the virtual viewpoint 38 exists at the first virtual viewpoint position A1, the vehicle 1 which is superimposed on the image is in a state as viewed from a slightly upper side in the front. As a result, the object 40 is displayed as being raised from the horizontal line and the presence of the object 40 is recognizable by the user. The data control portion 36 rotates the virtual image data by 180° in the horizontal direction about the vertical axis O in the same way as generating the virtual image data with the curved projection in a case where the virtual viewpoint 38 reaches the second virtual viewpoint position B (see FIGS. 14 and 15). In a case where the planar projection is employed, each of the objects 40 to 44 displayed by the virtual image data at the second virtual viewpoint position B is imaged substantially in a top view, which clarifies the positional relationship between the vehicle 1 and each of the objects 40 to 44 as compared to a case where the curved projection is employed. Upon completion of the rotation of the virtual image data, the data control portion 36 again sequentially displays the virtual image data so that the virtual viewpoint 38 is looked as moving again to the third virtual viewpoint position C1 and displays the virtual image data corresponding to the third virtual viewpoint position C1 (FIG. 16). A series of display processing is then terminated. As illustrated in FIG. 16, in a case where the virtual viewpoint 38 exists at the third virtual viewpoint position C1, the vehicle 1 superimposed on the image is in a state as viewed from the slightly upper side in the rear.

Accordingly, even in a case where the virtual image data is generated with the planar projection, the virtual viewpoint 38 is continuously moved to the first virtual viewpoint position A1, the second virtual viewpoint position B and the third virtual viewpoint position C1. In addition, the virtual image data is rotated at the position of the second virtual viewpoint position B by 180° in the horizontal direction. As a result, the user may be notified of the state of the surroundings of the vehicle 1 by the substantial moving image which is obtained by the viewpoint conversion image viewed from the virtual viewpoint 38. The state of the surroundings of the vehicle 1 (the actual world, the actual space) may be further easily grasped by the user. The position of the virtual viewpoint 38 continuously moves in the height direction and the direction from the first virtual viewpoint position A1 to the third virtual viewpoint position C1 so that how the object (for example, each of the objects 40 to 44) which exists in the surroundings of the vehicle 1 is looked changes from moment to moment. In the course of such change (continuous change), characteristics of the object (object in solid) become easily understood. Further, because the viewpoint conversion image is displayed continuously as the substantial moving image, changes of the form of the object may be easily grasped. That is, as compared to a case where the viewpoint conversion image is displayed intermittently or individually, the state of the surroundings of the vehicle 1 may be displayed so as to be easily understood by the user.

The third virtual viewpoint position C1 is set to be positioned at the rear side relative to the expected travelling direction of the vehicle 1 when the vehicle 1 is started so as to terminate the display of the virtual image data. Thus, as illustrated in FIG. 16, the user may be easily impressed by the state in the travelling direction and may be alerted at the time of the vehicle start.

In the aforementioned embodiment, the explanation is made in a manner that the position of the second virtual viewpoint position B at which the virtual image data is rotated includes the vertical axis O which is based on the vehicle 1 in the overhead region of the vehicle 1 (at a position directly above the vehicle 1). In another embodiment, the position at which the virtual image data is rotated is not limited to the position including the vertical axis O and may be a position displaced by a predetermined amount from the position of the vertical axis O in a front-rear direction, which may result in the same effect. In a case where the virtual image data is displayed so that the virtual viewpoint 38 moves through the first virtual viewpoint position A (A1), the second virtual viewpoint position B and the third virtual viewpoint position C (C1), the virtual image data is desirably displayed by the substantial moving image. Nevertheless, the virtual image data is not necessarily continuously displayed until the virtual viewpoint 38 reaches the third virtual viewpoint position C (C1) from the first virtual viewpoint position A (A1). For example, a still image may be present during the moving image. In addition, the display of the virtual image data may be immobilized by the user operating the operation portion 14g, for example, at the position of the virtual viewpoint to which attention is desirably paid. For example, in a case where the state of the surroundings of the vehicle 1 is displayed, the display by the virtual image data is temporarily turned to the still image in a situation where the attention is desirably paid to. As a result, the positional relationship between the vehicle 1 and the object and a starting path of the vehicle 1 may be easily considered.

In FIG. 6, the virtual viewpoint 38 moves on a substantially semicircular locus with reference to the vehicle 1. Nevertheless, as long as the virtual viewpoint 38 rotates at the second virtual viewpoint position B or in the vicinity thereof by 180°, moving mode of the virtual viewpoint 38 is appropriately changeable. For example, after the virtual viewpoint 38 moves up to a predetermined height from the first virtual viewpoint position A (A1), the virtual viewpoint 38 may move horizontally at the overhead region of the vehicle 1. During the horizontal movement, the virtual viewpoint 38 rotates by 180° in the horizontal direction and thereafter moves downward to the third virtual viewpoint position C (C1). In this case, a time period where the vehicle 1 is viewed from the upper side is elongated so that the display where the positional relationship between the vehicle 1 and the object is easily grasped is obtainable.

In the aforementioned embodiment, either the curved projection or the planar projection is employed for generating the virtual image data from the captured image data. Instead, the curved projection and the planar projection may be appropriately combined. For example, the curved projection may be employed in the vicinity of the first virtual viewpoint position A or the third virtual viewpoint position C and the planar projection may be employed at the other positions. In this case, a display region of the viewpoint conversion image may be enlarged by the change of the display start position and the display end position and the processing load at the image conversion portion 32 may be reduced.

In the aforementioned embodiment, the virtual image data is generated by the present image (real-time image) captured by the imaging portions 15. Alternatively, the virtual image data may be generated at delayed timing by temporarily storing the captured image data at the RAM 14c, for example. In this case, real-time performance of the display may slightly decrease. Nevertheless, the CPU 14a with a slow processing speed is usable, which may contribute to a cost reduction of the surroundings monitoring apparatus. In addition, a past image captured by the imaging portions 15 and stored at the RAM 14c, for example, may be employed for displaying the viewpoint conversion image as described in the present embodiment. In this case, not only the state of the surroundings of the vehicle 1 but also the state of a region where the vehicle 1 has moved (a position away from the present position of the vehicle 1) (the state in the past) may be grasped, which may increase opportunity for using the surroundings monitoring apparatus.

The embodiment and the modified examples of the invention are explained as above. Nevertheless, such embodiment and modified examples thereof are provided as examples and do not intend to limit the scope of the invention. The aforementioned new embodiment may be performed in various modes. Various omissions, replacements and changes may be conducted on the embodiment within a scope not departing from a principle of the invention. The embodiment and the modification thereof are included in the scope of the invention and in the invention described in the scope of claims and equivalents.

EXPLANATION OF REFERENCE NUMERALS

1: vehicle, 2: vehicle body, 8: display unit, 14: ECU, 14a: CPU, 14b: ROM, 14d: display control portion, 14g: operation portion, 15, 15a, 15b, 15c, 15d: imaging portion, 30: image acquisition portion, 32: image conversion portion, 34: operation receiving portion, 36: data control portion, 38: virtual viewpoint, 40, 42, 44: object, 100: surroundings monitoring system (surroundings monitoring apparatus), A, A1: first virtual viewpoint position, B: second virtual viewpoint position, C, C1: third virtual viewpoint position, O: vertical axis

The invention claimed is:
1. A surroundings monitoring apparatus comprising:
a processor configured to
acquire captured image data output from an imaging portion which is mounted at a vehicle to capture an image of surroundings of the vehicle;
convert the captured image data to virtual image data with a plurality of virtual viewpoints serving as imaging directions towards the vehicle; and
sequentially display the virtual image data at a display unit provided at a vehicle interior of the vehicle in a state where each of the virtual viewpoints moves from a first virtual viewpoint position at which an opposite side of the vehicle is viewed beyond a whole of the vehicle from one side of the vehicle, through a second virtual viewpoint position at which the vehicle is viewed from an overhead region of the vehicle, and to a third virtual viewpoint position at which the one side of the vehicle is viewed beyond the whole of the vehicle from the other side of the vehicle, wherein
the whole of the vehicle is displayed together with the virtual image data during a period when the virtual viewpoint moves from the first virtual viewpoint position, through the second virtual viewpoint position, and to the third virtual viewpoint position, and
the virtual image data is rotated with reference to a line of sight of the virtual viewpoint while the virtual image data is displayed so that the virtual viewpoint passes through the second virtual viewpoint position,
wherein the second virtual viewpoint position is positioned directly above the vehicle, and
wherein the control portion rotates the virtual image data is rotated by 180° at the second virtual viewpoint position which is positioned directly above the vehicle.

2. The surroundings monitoring apparatus according to claim 1, wherein the third virtual viewpoint position is positioned at a rear side relative to an expected travelling direction of the vehicle in a case where the vehicle is started.

3. The surroundings monitoring apparatus according to claim 1, wherein the image conversion portion converts the captured image data to the virtual image data by projecting the captured image data on a curved surface with reference to the position of the vehicle.

4. The surroundings monitoring apparatus according to claim 1, wherein the captured image data is converted to the virtual image data by projecting the captured image data on a plane with reference to the position of the vehicle.

5. The surroundings monitoring apparatus according to claim 1, wherein an image of an own vehicle is displayed by superimposing the image on the virtual image data.

6. The surroundings monitoring apparatus according to claim 1, wherein
the virtual image data is displayed together with the vehicle so that the vehicle is between the virtual viewpoint and the virtual image data and positioned at or near center of a display area of the display unit while the virtual viewpoint moves from the first virtual viewpoint position, through the second virtual viewpoint position, and to the third virtual viewpoint position.

7. A surroundings monitoring method comprising:
acquiring captured image data output from an imaging portion which is mounted at a vehicle to capture an image of surroundings of the vehicle;
converting the captured image data to virtual image data with a plurality of virtual viewpoints serving as imaging directions towards the vehicle; and
sequentially displaying the virtual image data at a display unit provided at a vehicle interior of the vehicle in a state where each of the virtual viewpoints moves from a first virtual viewpoint position at which an opposite side of the vehicle is viewed beyond a whole of the vehicle from one side of the vehicle, through a second virtual viewpoint position at which the vehicle is viewed from an overhead region of the vehicle, and to a third virtual viewpoint position at which the one side of the vehicle is viewed beyond the whole of the vehicle from the other side of the vehicle, wherein
the whole of the vehicle is displayed together with the virtual image data during a period when the virtual viewpoint moves from the first virtual viewpoint position, through the second virtual viewpoint position, and to the third virtual viewpoint position, and
the virtual image data is rotated with reference to a line of sight of the virtual viewpoint while the virtual image data is displayed so that the virtual viewpoint passes through the second virtual viewpoint position,
wherein the second virtual viewpoint position is positioned directly above the vehicle, and
wherein the control portion rotates the virtual image data is rotated by 180° at the second virtual viewpoint position which is positioned directly above the vehicle.

8. The surroundings monitoring method according to claim 7, wherein the third virtual viewpoint position is positioned at a rear side relative to an expected travelling direction of the vehicle in a case where the vehicle is started.

9. The surroundings monitoring method according to claim 7, wherein the image conversion portion converts the captured image data to the virtual image data by projecting the captured image data on a curved surface with reference to the position of the vehicle.

10. The surroundings monitoring method according to claim 7, wherein the captured image data is converted to the virtual image data by projecting the captured image data on a plane with reference to the position of the vehicle.

11. The surroundings monitoring method according to claim 7, wherein an image of an own vehicle is displayed by superimposing the image on the virtual image data.

12. The surroundings monitoring method according to claim 7, wherein the virtual image data is displayed together with the vehicle so that the vehicle is between the virtual viewpoint and the virtual image data and positioned at or near center of a display area of the display unit while the virtual viewpoint moves from the first virtual viewpoint position, through the second virtual viewpoint position, and to the third virtual viewpoint position.

\* \* \* \* \*